(12) United States Patent
Godart et al.

(10) Patent No.: US 12,369,516 B2
(45) Date of Patent: Jul. 29, 2025

(54) BRUSH BELT FOR SEED DELIVERY

(71) Applicant: DEERE & COMPANY, Moline, IL (US)

(72) Inventors: Luc Godart, Toutlemonde (FR); Patrick Beauneveu, Chiche (FR); Bruno Berthonneau, Bressuire (FR); Damien Dole, Bressuire (FR)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/422,940

(22) Filed: Jan. 25, 2024

(65) Prior Publication Data

US 2024/0196785 A1 Jun. 20, 2024

Related U.S. Application Data

(63) Continuation of application No. 16/837,525, filed on Apr. 1, 2020, now Pat. No. 11,910,740.

(51) Int. Cl.
*A01C 7/16* (2006.01)
*A01C 7/04* (2006.01)

(52) U.S. Cl.
CPC .......... *A01C 7/16* (2013.01); *A01C 7/04* (2013.01); *A01C 7/046* (2013.01)

(58) Field of Classification Search
CPC .... A01C 7/16; A01C 7/08; A01C 7/00; A01C 7/04
See application file for complete search history.

(56) References Cited

U.S. PATENT DOCUMENTS

| | | |
|---|---|---|
| 501,197 A | 7/1893 | Taylor |
| 1,092,284 A | 4/1914 | Nichols |
| 2,787,105 A | 4/1957 | Witwer |
| 3,576,216 A | 4/1971 | Tanke |
| 6,543,083 B1 | 4/2003 | Edwards |

(Continued)

FOREIGN PATENT DOCUMENTS

| | | |
|---|---|---|
| CN | 1700875 A | 11/2005 |
| EP | 2901832 A1 | 8/2015 |
| GB | 827930 A | 2/1960 |

OTHER PUBLICATIONS

Kullen-Koti GmbH, "Toothed-Belt Brushes," <https://www.kullen.de/en/products/product-catalogue/belt-brushes/toothed-belt-brushes/> web page publicly available as early as Jan. 23, 2020 (4 pages).

Kullen-Koti GmbH, "Flat-Belt Brushes," <https://www.kullen.de/en/products/product-catalogue/belt-brushes/flat-belt-brushes/> web page publicly available as early as Jan. 23, 2020 (6 pages).

(Continued)

*Primary Examiner* — Christopher J. Novosad
(74) *Attorney, Agent, or Firm* — Michael Best & Friedrich LLP

(57) ABSTRACT

A brush belt includes a base member having a drive surface configured to engage a drive member and a mounting surface opposite the drive surface, the mounting surface having a longitudinal axis, a first edge, and second edge, the first edge and the second edge being positioned on opposite sides of the mounting surface and extending parallel to the longitudinal axis, and a plurality of bristles, each bristle having a first end that is proximal to the mounting surface and a second end distal thereto, the second ends of the bristles collectively defining an undulating surface profile relative to the mounting surface when viewed parallel to the mounting surface and perpendicular to the longitudinal axis from either the first edge or the second edge.

20 Claims, 29 Drawing Sheets

(56) References Cited

U.S. PATENT DOCUMENTS

| | | |
|---|---|---|
| 6,554,079 B2 | 4/2003 | Douglas |
| 7,343,868 B2 | 3/2008 | Stephens et al. |
| 7,644,466 B2 | 1/2010 | Weihrauch et al. |
| 8,074,586 B2 | 12/2011 | Garner et al. |
| 8,850,998 B2 | 10/2014 | Garner et al. |
| 9,686,905 B2 | 6/2017 | Garner et al. |
| 11,723,303 B2 | 8/2023 | Garner et al. |
| 2001/0042280 A1 | 11/2001 | Moskovich et al. |
| 2004/0134400 A1 | 7/2004 | Thiemke et al. |
| 2005/0196544 A1 | 9/2005 | Davis et al. |
| 2013/0104924 A1 | 5/2013 | Higgins |
| 2014/0250852 A1 | 9/2014 | Palm |
| 2019/0098828 A1 | 4/2019 | Wilhelmi et al. |
| 2020/0000012 A1 | 1/2020 | Hubner et al. |
| 2020/0000017 A1 | 1/2020 | Marler, III et al. |

OTHER PUBLICATIONS

Kullen-Koti GmbH, "Vee-Belt Brushes," <https://www.kullen.de/en/products/product-catalogue/belt-brushes/vee-belt-brushes/> web page publicly available as early as Jan. 23, 2020 (4 pages).

Extended European Search Report and Written Opinion issued in European Patent Application No. 21164762.3, Dated Aug. 26, 2021, in 8 pages.

Extended European Search Report and Written Opinion issued in European Patent Application No. 21164763.1, Dated Aug. 31, 2021, in 8 pages.

Extended European Search Report and Written Opinion issued in European Patent Application No. 21164767.2, Dated Aug. 26, 2021, in 8 pages.

Extended European Search Report and Written Opinion issued in European Patent Application No. 21164768.0, Dated Aug. 26, 2021, in 8 pages.

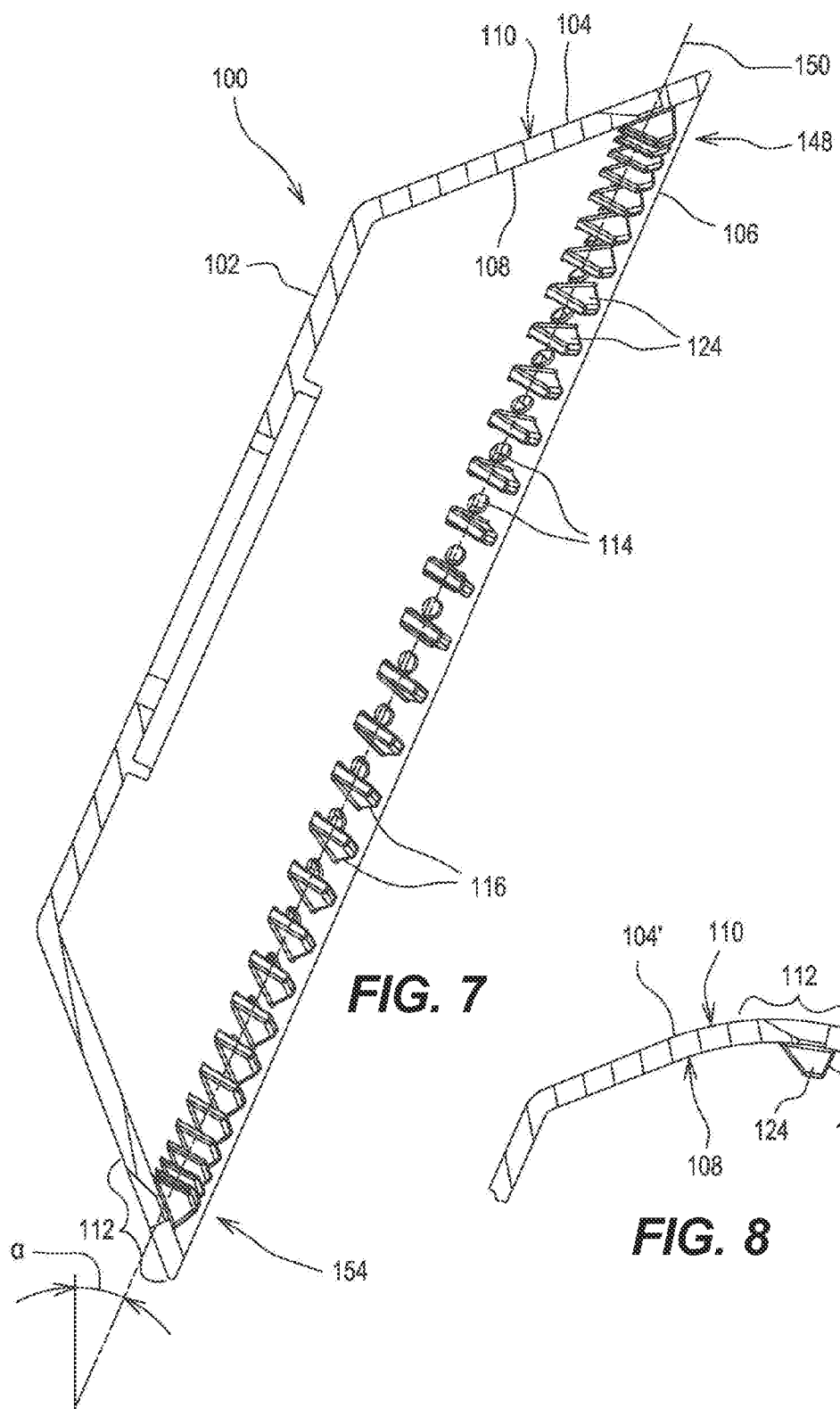

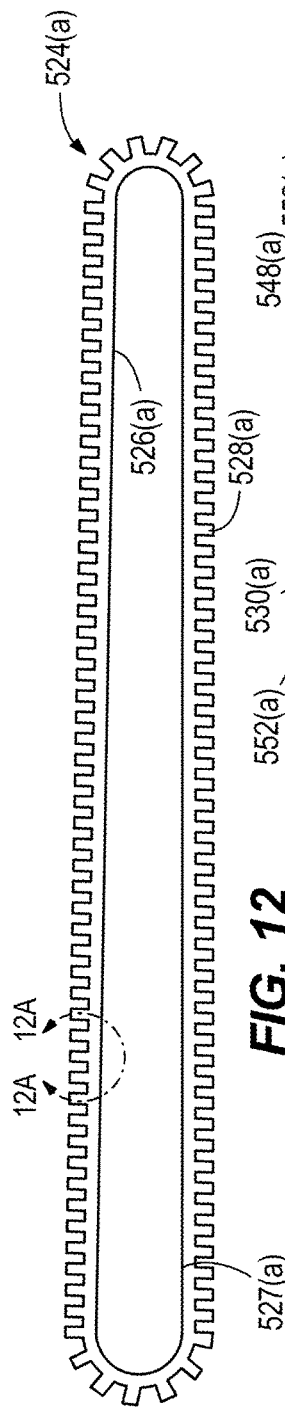
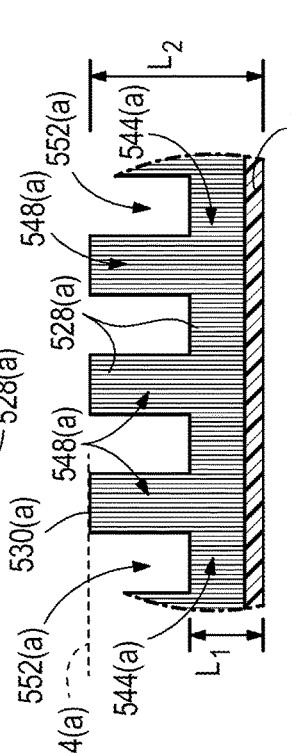
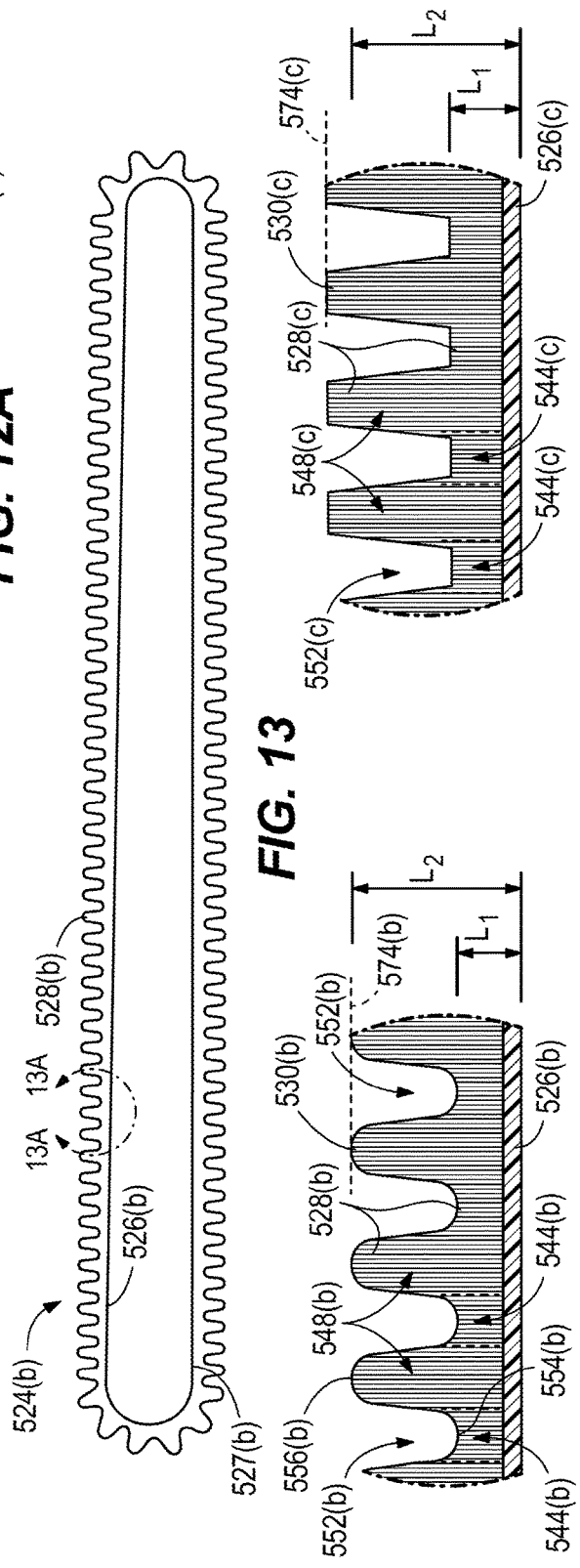
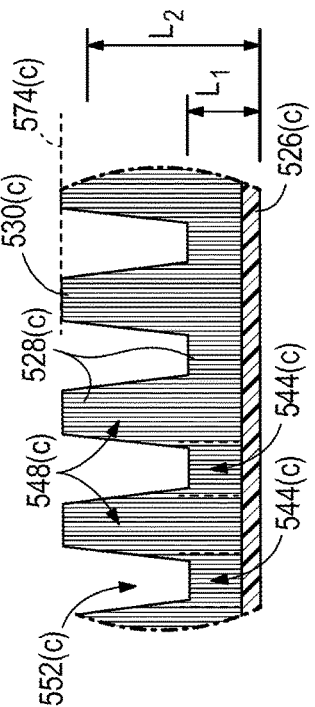

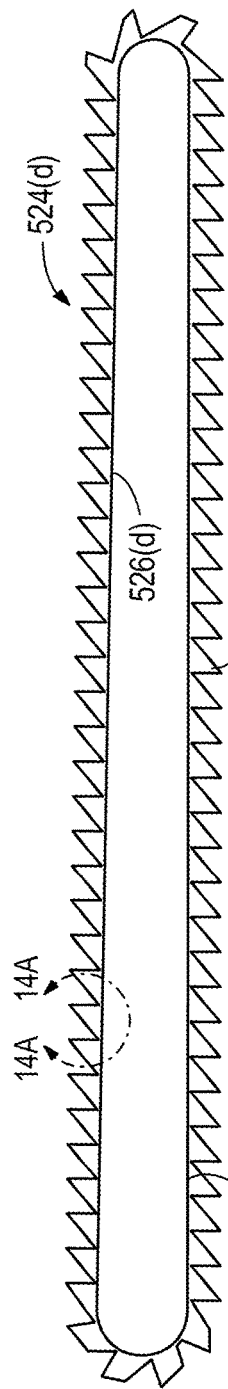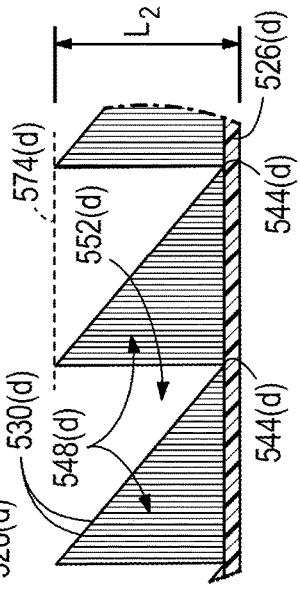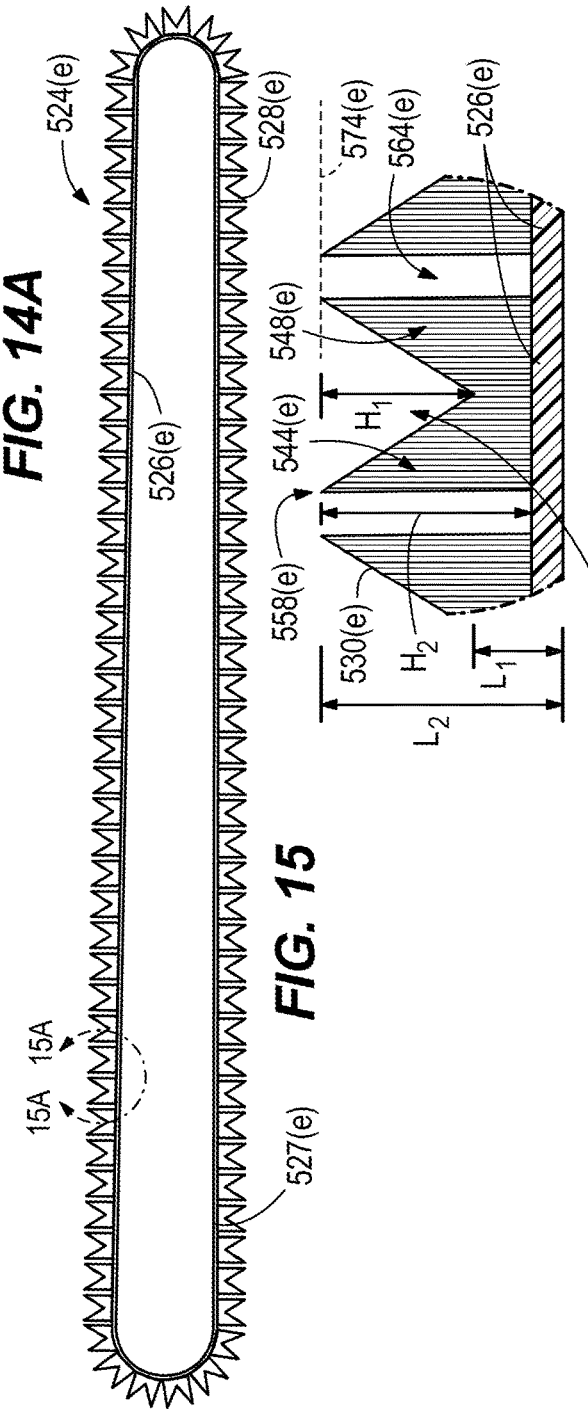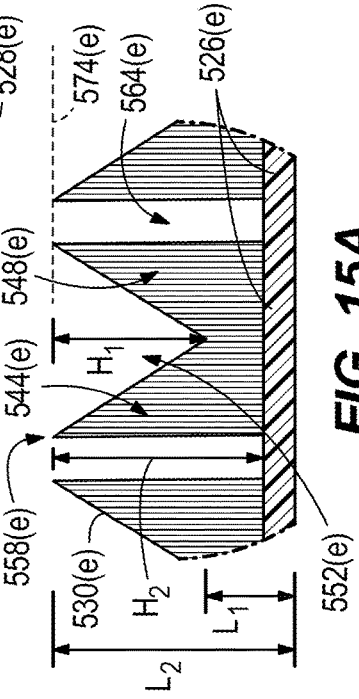

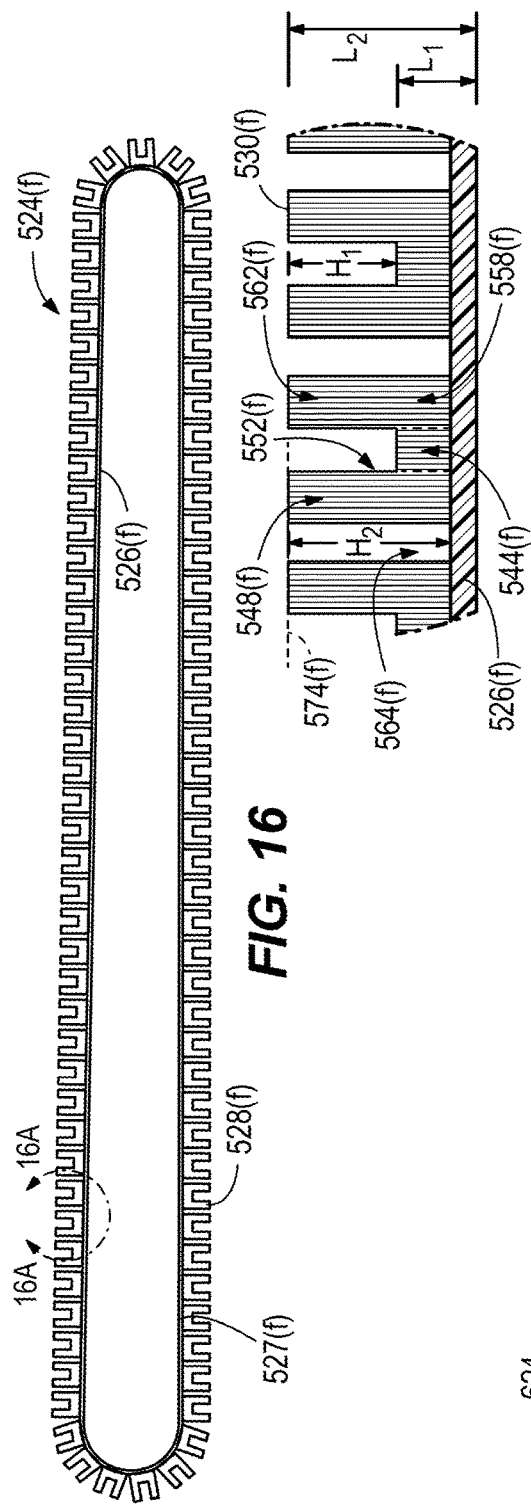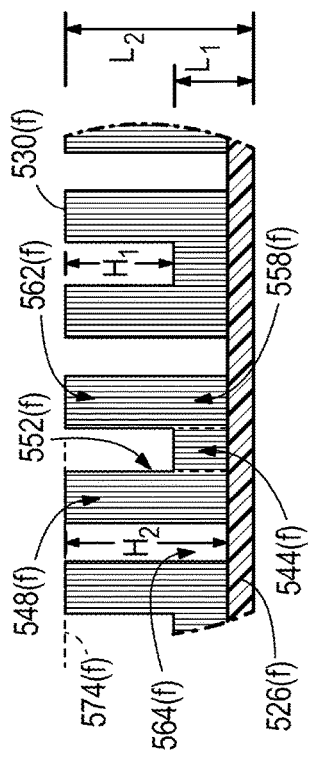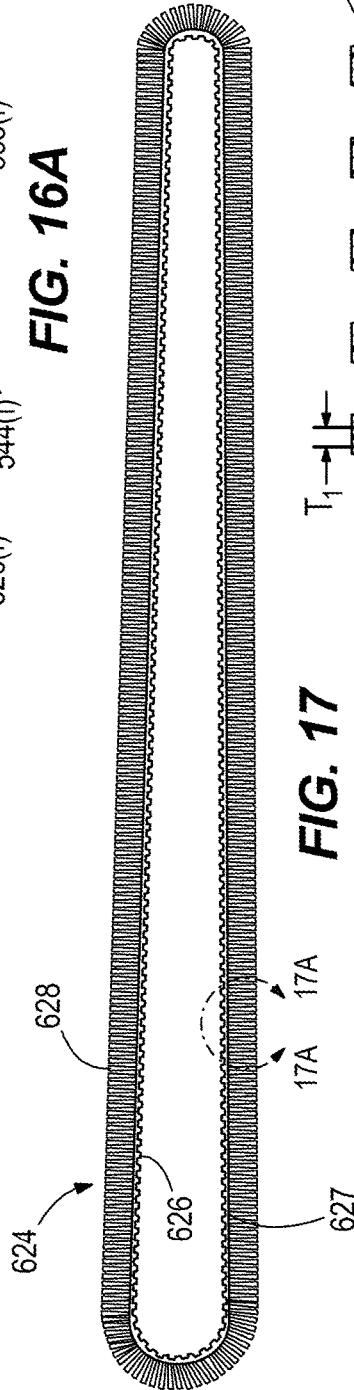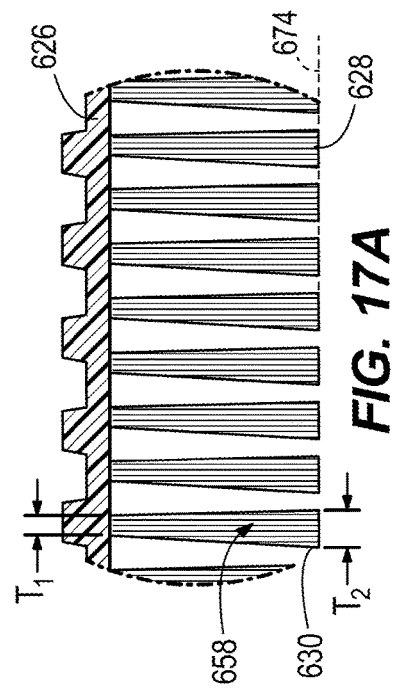

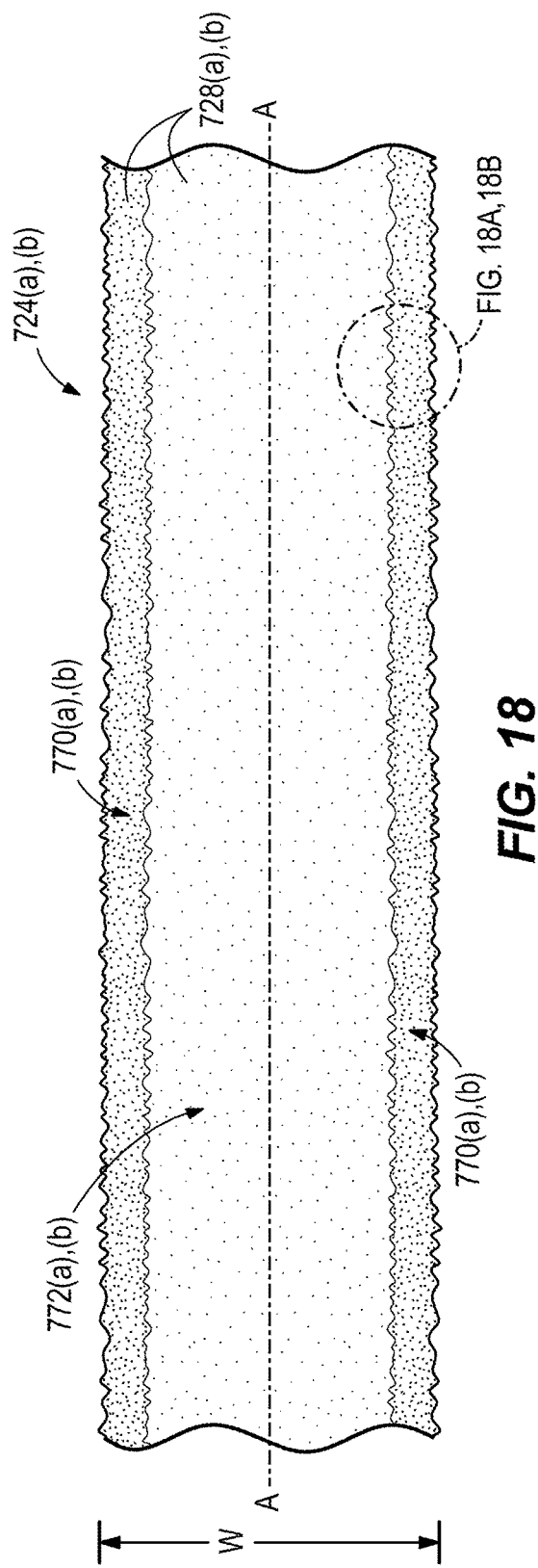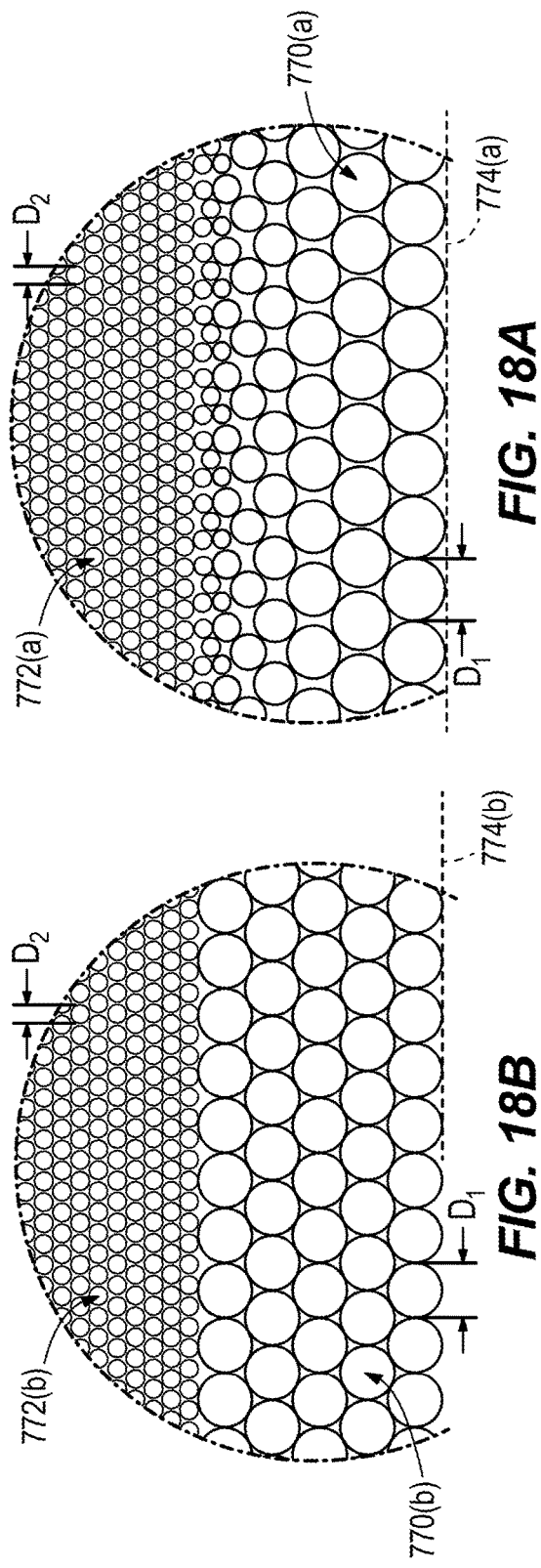

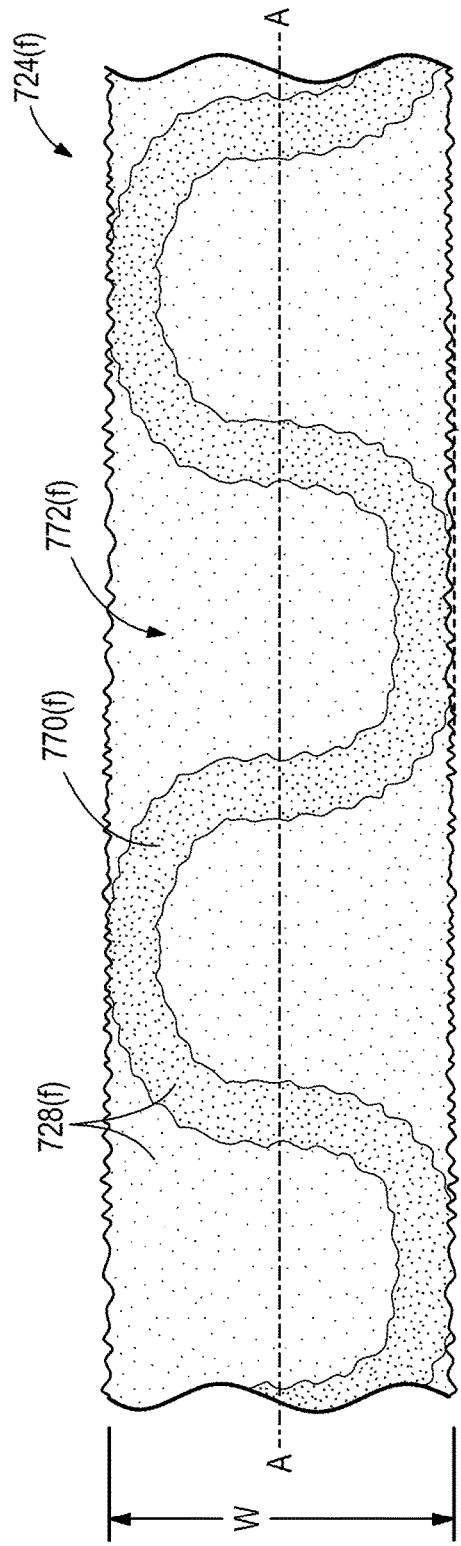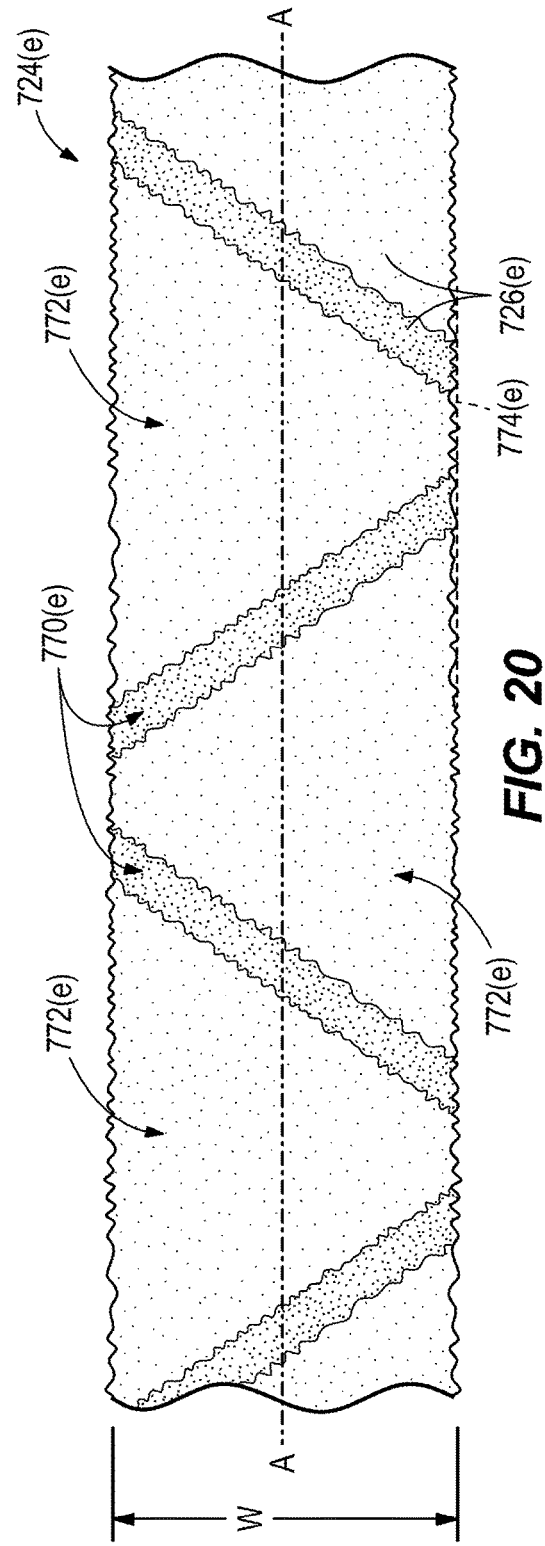
FIG. 21
FIG. 20

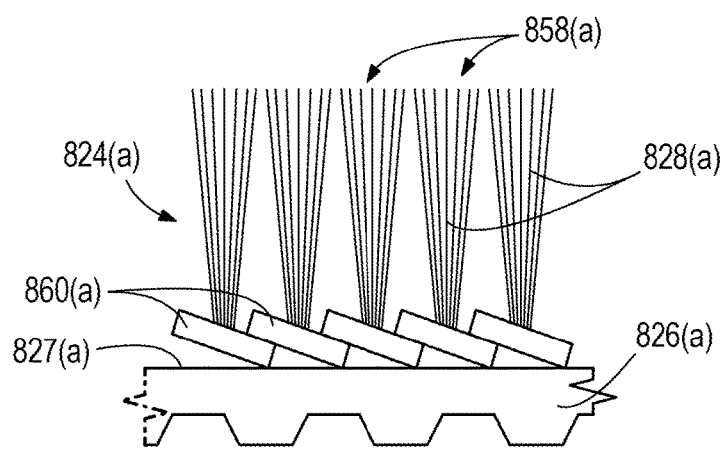
FIG. 23
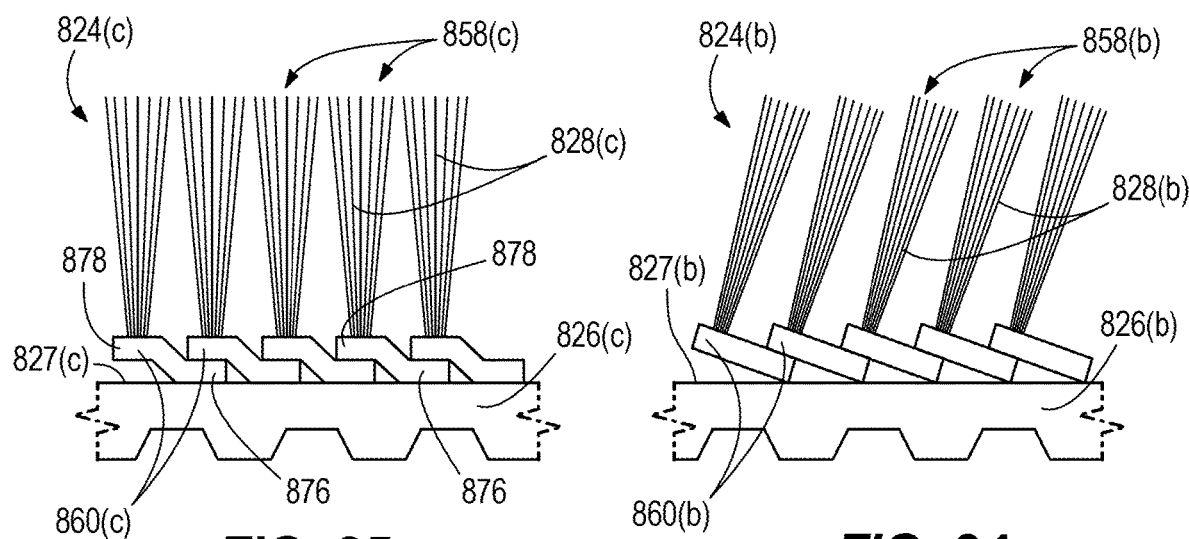
FIG. 25  FIG. 24

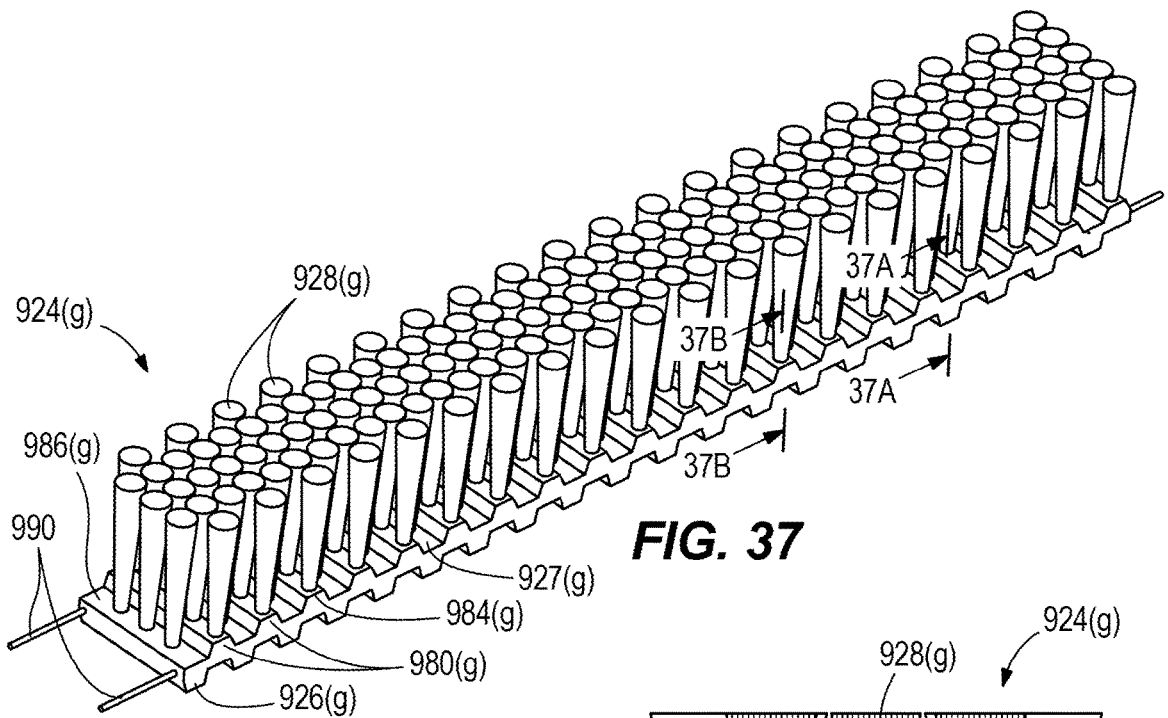
FIG. 37
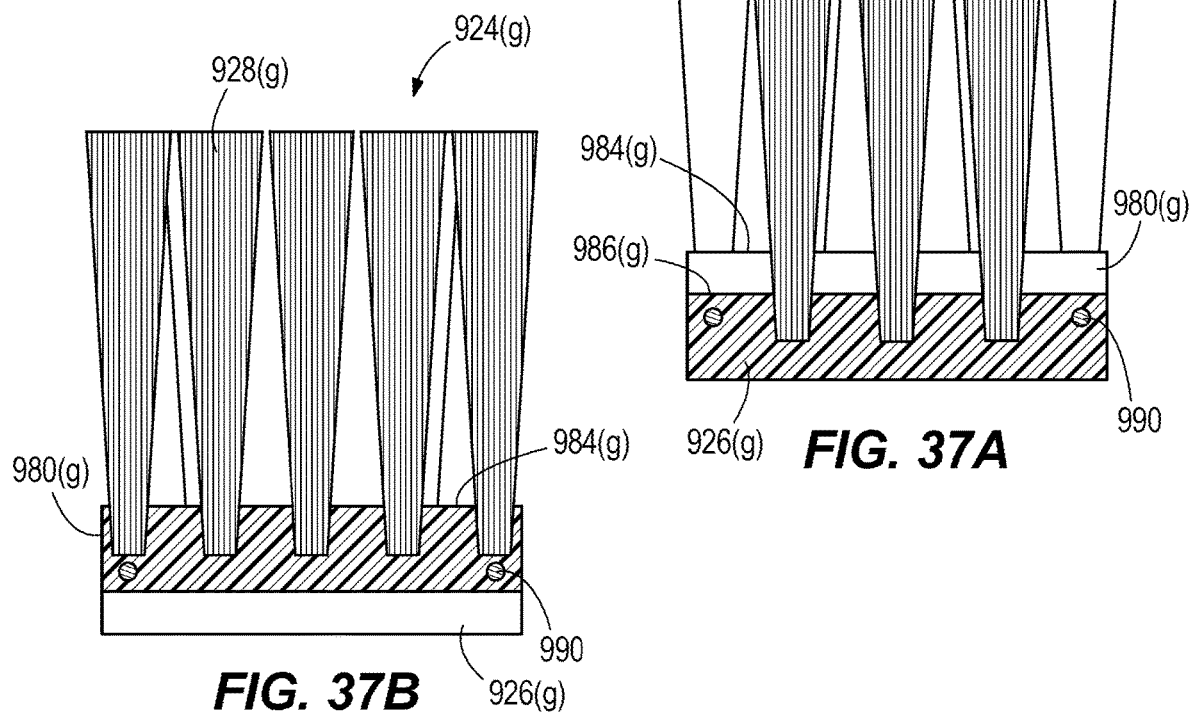
FIG. 37A
FIG. 37B

BRUSH BELT FOR SEED DELIVERY

CROSS REFERENCE TO RELATED APPLICATIONS

The present application is continuation of U.S. application Ser. No. 16/837,525, filed Apr. 1, 2020, the entire contents of which are herein incorporated by reference.

FIELD OF THE DISCLOSURE

The present disclosure relates to a planting unit for a seeding machine and more particularly to a planting unit having a seed meter and seed delivery system.

SUMMARY

In one aspect, a brush belt includes a base member having a drive surface configured to engage a drive member and a mounting surface opposite the drive surface, the mounting surface having a longitudinal axis, a first edge, and second edge, the first edge and the second edge being positioned on opposite sides of the mounting surface and extending parallel to the longitudinal axis, and a plurality of bristles, each bristle having a first end that is proximal to the mounting surface and a second end distal thereto, the second ends of the bristles collectively defining an undulating surface profile relative to the mounting surface when viewed parallel to the mounting surface and perpendicular to the longitudinal axis from either the first edge or the second edge.

In another aspect, a brush belt includes a base member having first side with a traction surface and a second side that is opposite the first side, the first side having a mounting surface having a longitudinal axis, a first edge, and second edge, the first edge and the second edge being positioned on opposite sides of the mounting surface and extending parallel to the longitudinal axis, and a plurality of bristles, each of the bristles of the plurality of bristles having a first end that is proximal to the mounting surface and a second end distal thereto, the bristles being arranged in first bristle clusters that have the first length and second bristle clusters that have a second length, the first bristle clusters and second bristle clusters alternating in the direction of the longitudinal axis.

In yet another aspect, a brush belt includes a base member having a drive surface configured to engage a drive member and a mounting surface opposite the drive surface, the mounting surface having a longitudinal axis, a first edge, and second edge, the first edge and the second edge being positioned on opposite sides of the mounting surface and extending parallel to the longitudinal axis, and a plurality of bristles, each bristle having a first end that is proximal to the mounting surface and a second end distal thereto, some of the bristles having a first length and some of the bristles having a second length that is different than the first length, the first length being 25% to 98% of the second length.

In addition, other aspects of the disclosure will become apparent by consideration of the detailed description and accompanying drawings.

BRIEF DESCRIPTION OF THE DRAWINGS

FIG. 7 is side cross-section of the metering member of FIG. 6 illustrating the orientation of the metering member installed in a seed meter mounted to a planting unit.

FIG. 8 is a fragmentary cross-section of an alternative metering member.

FIG. 12 is a side view of a brush belt for the delivery system according to one aspect.

FIG. 12A is a cross-sectional view of the brush belt of FIG. 12.

FIG. 13 is a side view of a brush belt for the delivery system according to another aspect.

FIG. 13A is a cross-sectional view of the brush belt of FIG. 13.

FIG. 13B is a cross-sectional view of a brush belt according to another aspect.

FIG. 14 is a side view of a brush belt for the delivery system according to another aspect.

FIG. 14A is a cross-sectional view of the brush belt of FIG. 14.

FIG. 15 is a side view of a brush belt for the delivery system according to another aspect.

FIG. 15A is a cross-sectional view of the brush belt of FIG. 15.

FIG. 16 is a side view of a brush belt for the delivery system according to another aspect.

FIG. 16A is a cross-sectional view of the brush belt of FIG. 16.

FIG. 17 is a side view of a brush belt for the delivery system according to another aspect.

FIG. 17A is a cross-sectional view of the brush belt of FIG. 17.

FIG. 18 is an elevational view of a brush belt for the delivery system according to another aspect.

FIG. 18A is enlarged view of a portion of the brush belt of FIG. 18 illustrating an exemplary arrangement of the bristles of the brush belt.

FIG. 18B is an enlarged view of a portion of the brush belt of FIG. 18 illustrating another exemplary arrangement of the bristles of the brush belt.

FIG. 20 is an elevational view of a brush belt for the delivery system according to another aspect.

FIG. 21 is an elevational view of a brush belt for the delivery system according to another aspect.

FIG. 23 is a side view of a brush belt for the delivery system according to another aspect.

FIG. 24 is a side view of a brush belt for the delivery system according to another aspect.

FIG. 25 is a side view of a brush belt for the delivery system according to another aspect.

FIG. 37 is a perspective view of a brush belt for the delivery system according to another aspect.

FIG. 37A is a cross-sectional view of the brush belt along line 37A-37A of FIG. 37.

FIG. 37B is a cross-sectional view of the brush belt along line 37B-37B of FIG. 37.

DETAILED DESCRIPTION

Before any aspects of the disclosure are explained in detail, it is to be understood that the disclosure is not limited in its application to the details of construction and the arrangement of components set forth in the following description or illustrated in the following drawings. The disclosure is capable of supporting other aspects and being practiced or being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described aspects.

Figure 1:
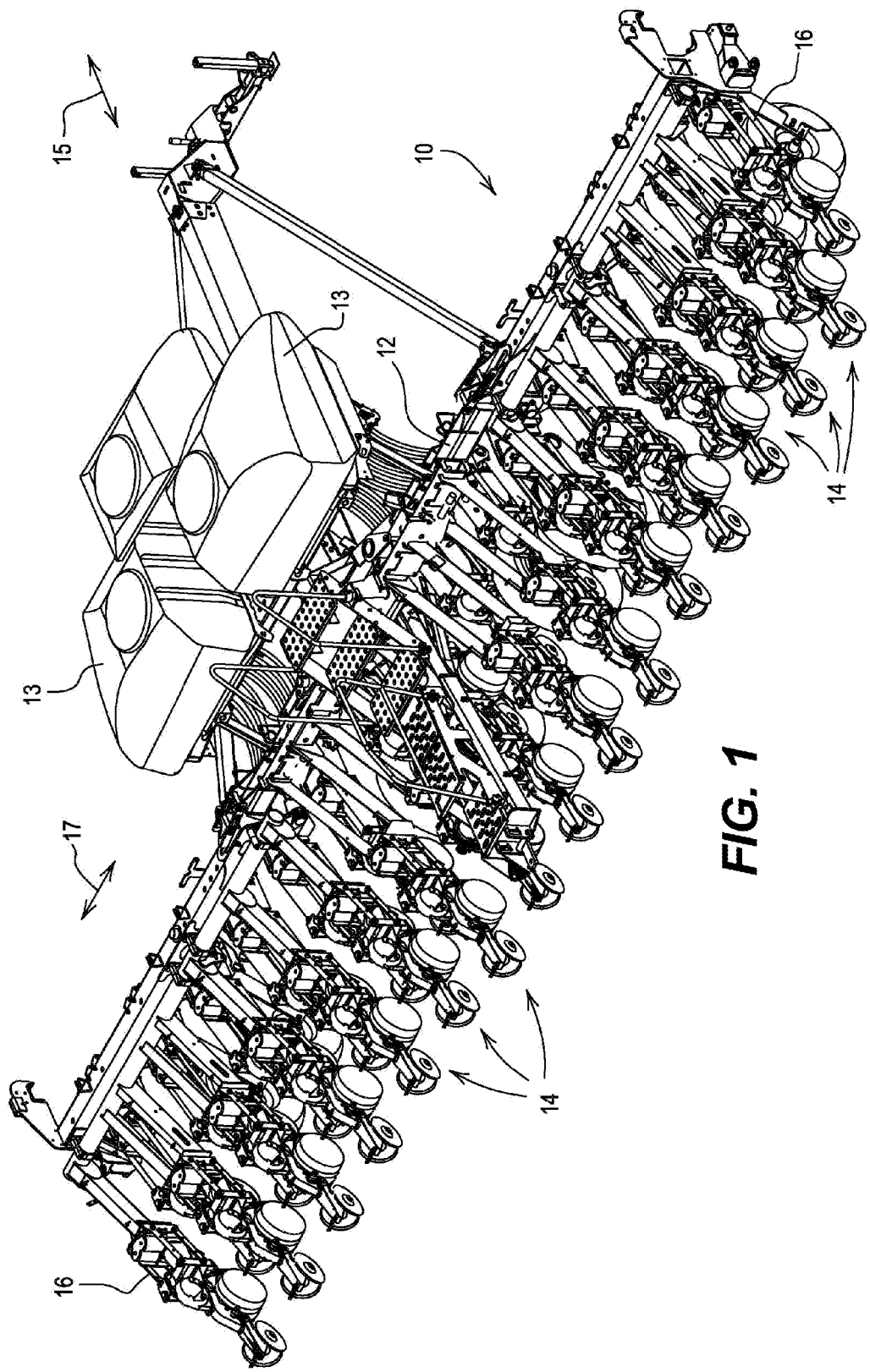
FIG. 1 is a perspective view of a common agricultural planter.
Figure 2:
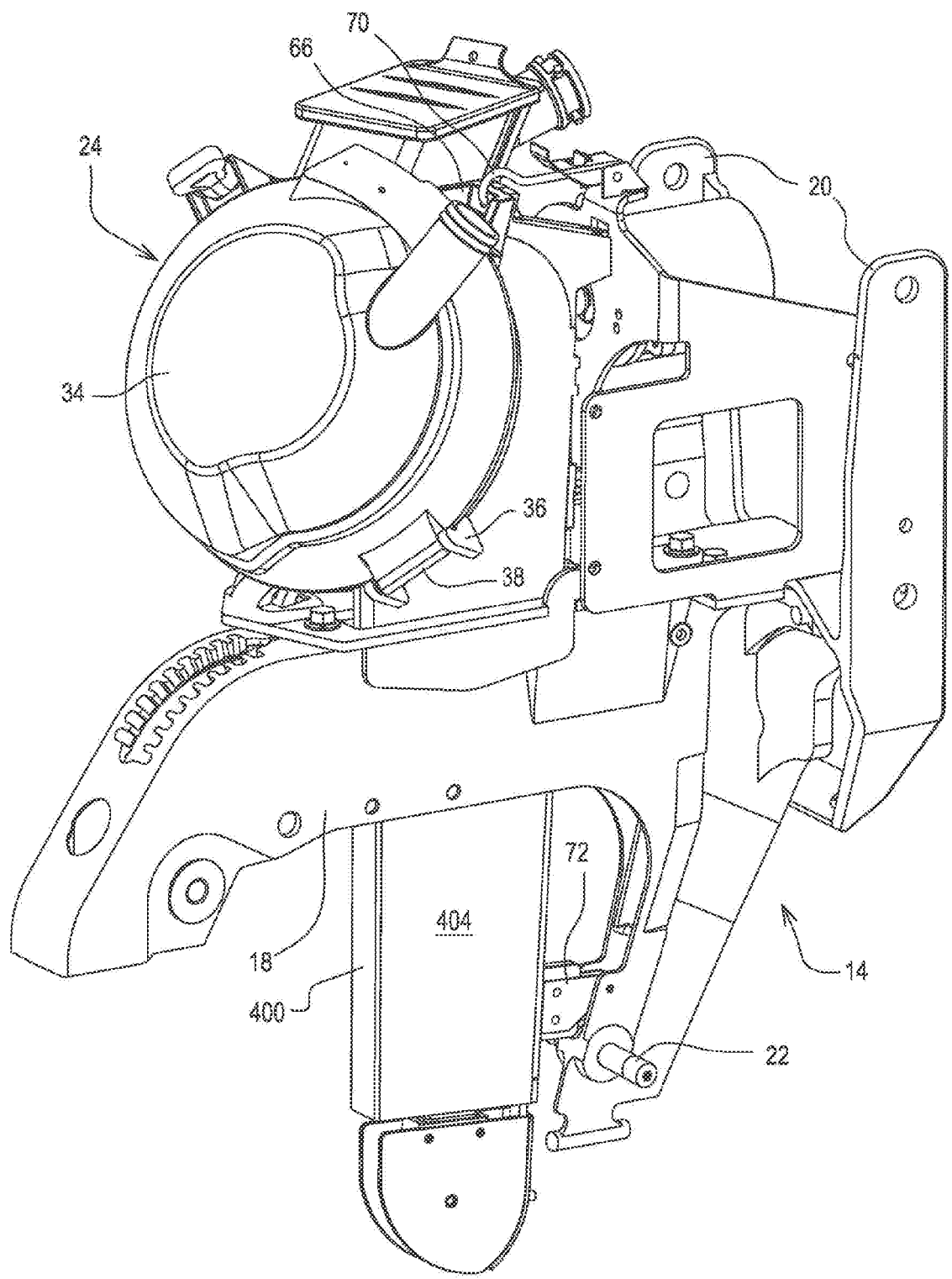
FIG. 2 is a side perspective view of a planting unit frame, seed meter and seed delivery system.

An agricultural seeding machine 10 is shown in FIG. 1 as a row crop planter. Seeding machine 10 has a central frame 12 on which are mounted a plurality of individual planting units 14. The seeding machine 10 has a fore-aft direction shown by the arrow 15 and a transverse direction shown by the arrow 17. Each planting unit 14 is coupled to the central frame 12 by a parallel linkage 16 so that the individual planting units 14 may move up and down to a limited degree relative to the frame 12. Large storage tanks 13 hold seed that is delivered pneumatically to a mini-hopper on each planting unit. Each planting unit 14 has a frame member 18 (FIG. 2) to which the components of the planting unit are mounted. The frame member 18 includes a pair of upstanding arms 20 at the forward end thereof. The arms 20 are coupled to the rearward ends of the parallel linkage 16. Furrow opening disks (not shown) are attached to shaft 22 in a known manner to form an open furrow in the soil beneath the seeding machine into which seed is deposited. Closing and packing wheels (not shown) are also mounted to the frame member 18 in a known manner to close the furrow over the deposited seed and to firm the soil in the closed furrow. A seed meter 24 and a seed delivery system 400 are also attached to the frame member 18 of the planting unit.

Figure 5:
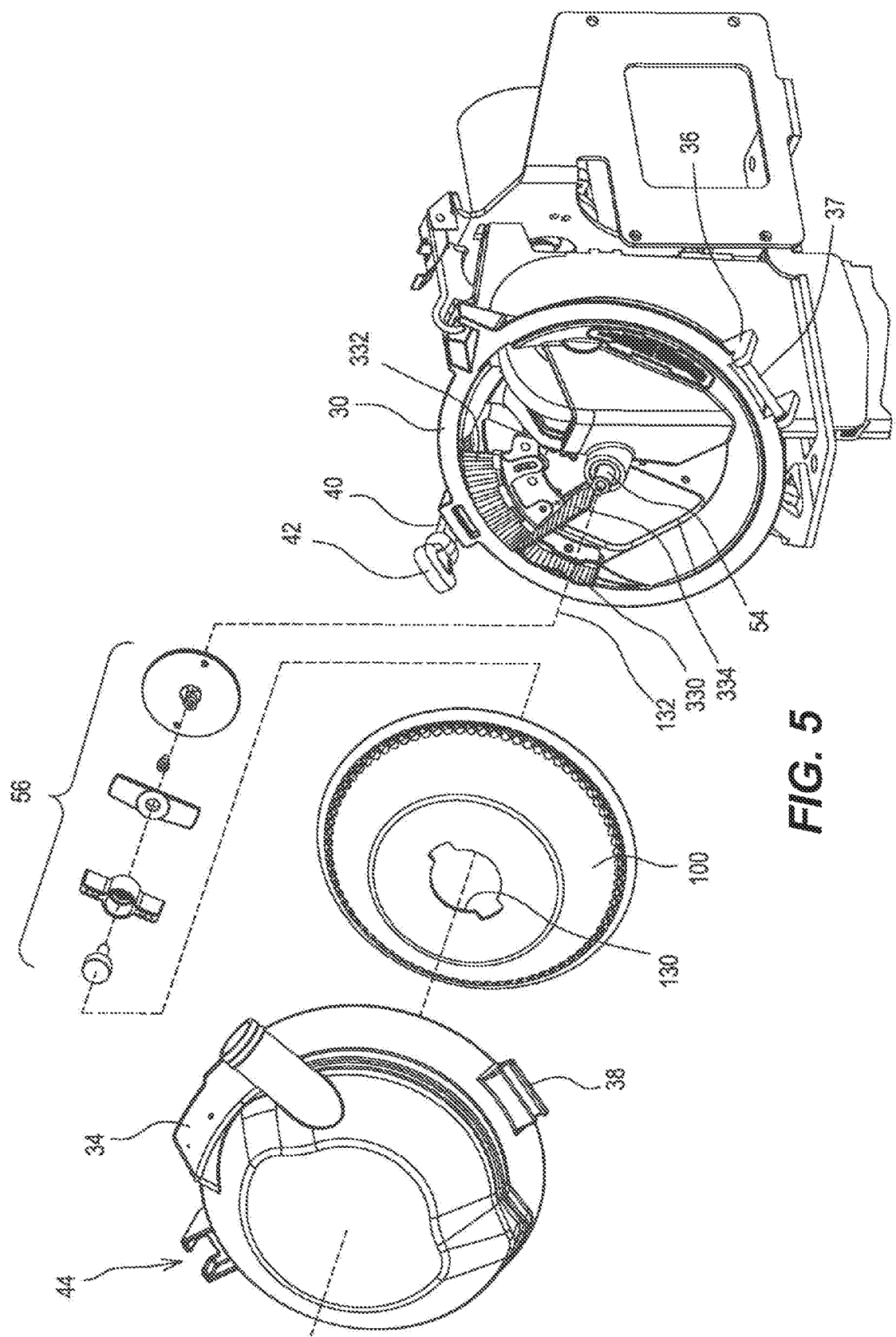
FIG. 5 is an exploded perspective view of the seed meter of FIG. 4.

The meter 24 includes a housing 30 (FIG. 3) and a cover 34. The housing 30 and the cover 34 are coupled to one another by complementary hinge features 36 and 38 (see FIG. 5) on the housing and cover, respectively.

A drive spindle 54 is carried by the housing 30 and has a drive hub 56 (FIG. 5) on the end thereof. The spindle 54 couples to the output shaft 58 of electric motor 60 to drive the seed meter when in the assembled position shown in FIG. 3. The delivery system further has a mounting hook 72, partially shown in FIG. 2, which attaches to the planting unit frame member 18 to support the delivery system.

Figure 3:
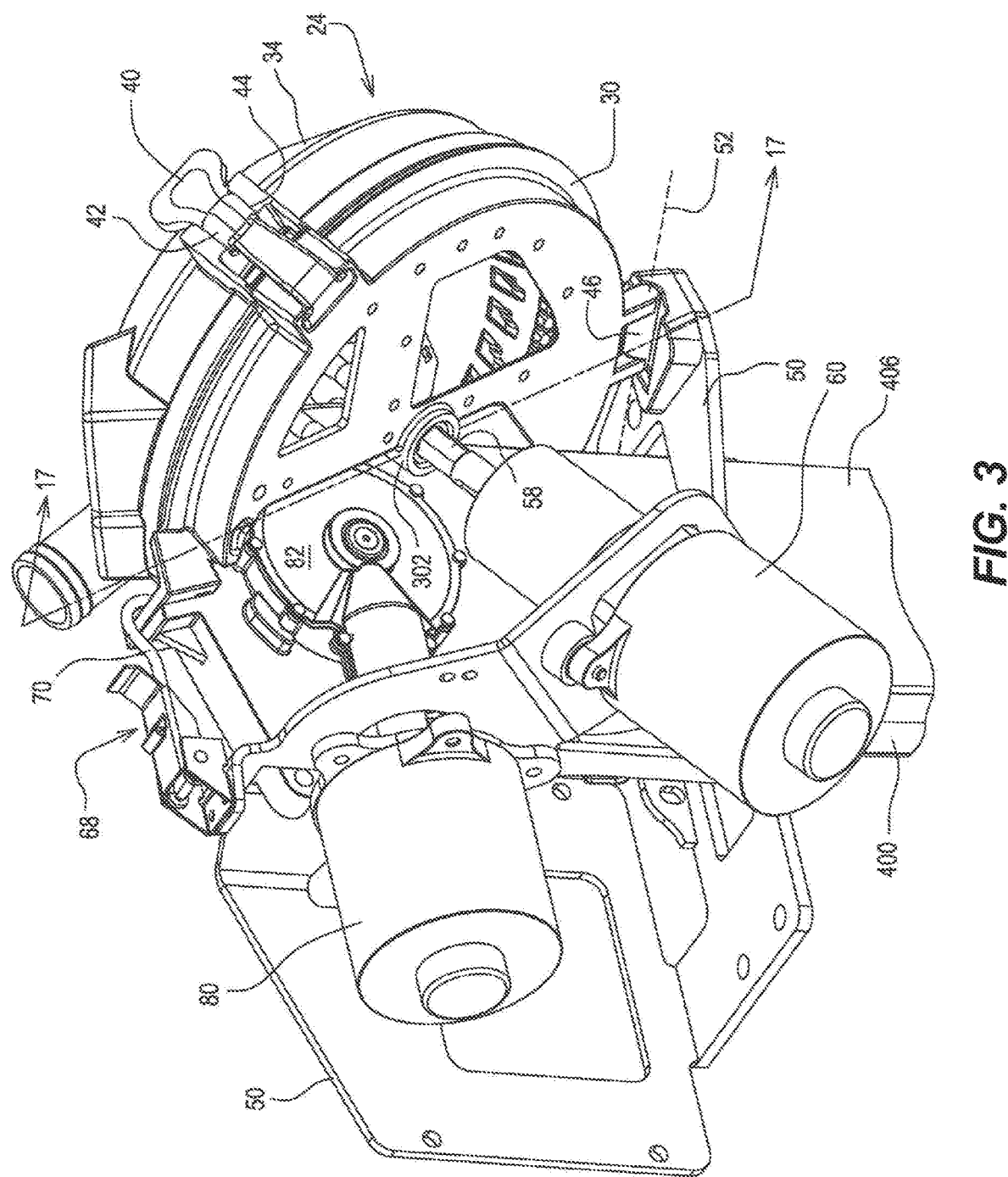
FIG. 3 is an enlarged perspective view of the seed meter and delivery system drives.
Figure 4:
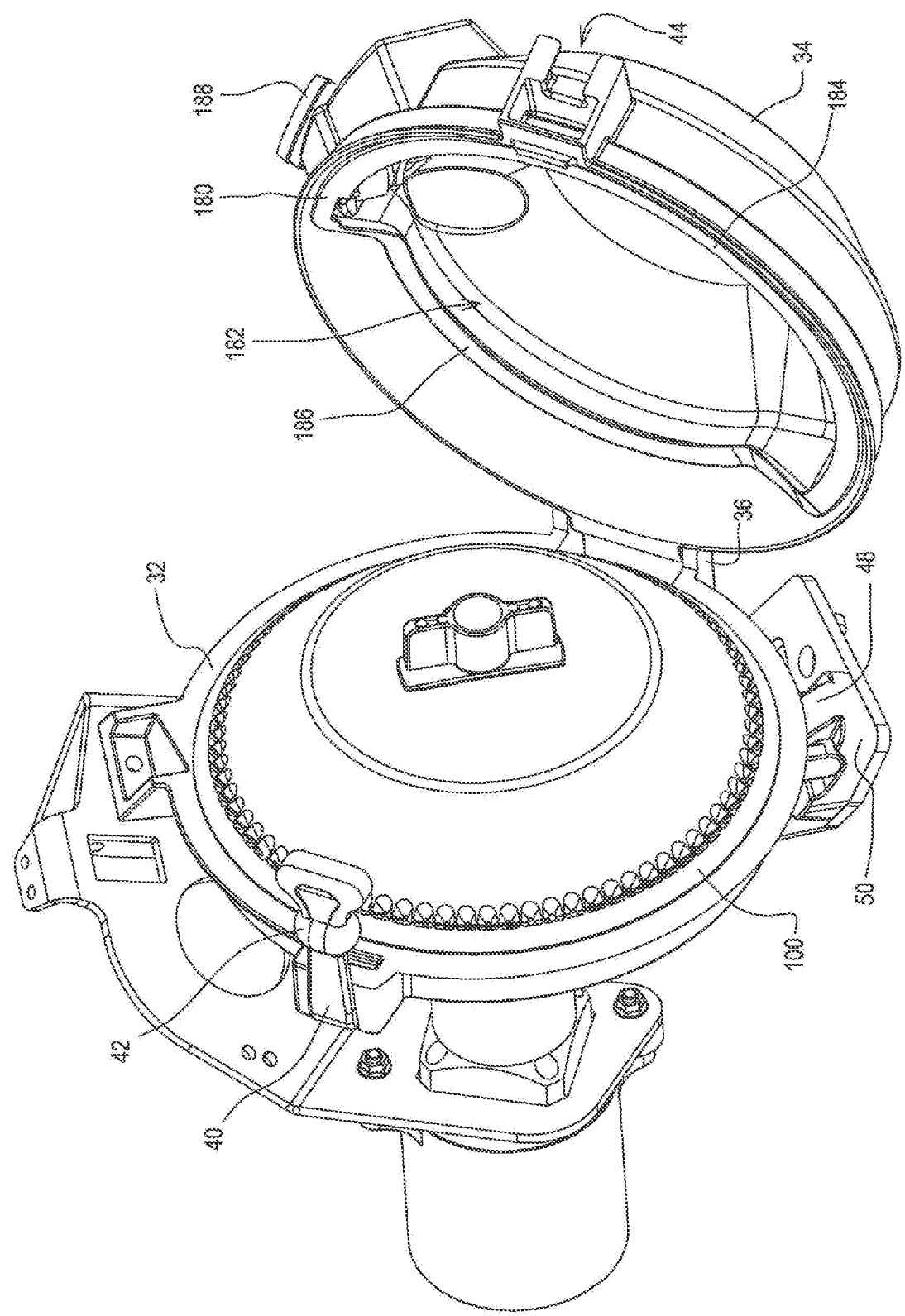
FIG. 4 is a perspective view of the seed meter with the cover open illustrating the metering member.

With respect to FIG. 3, the delivery system 400 is driven by an electric motor 80, also carried by the mounting frame 50. The output shaft of motor 80 is connected to the delivery system through a right-angle drive 82. While electric motors may drive both the seed meter and the seed delivery system, it will be appreciated by those skilled in the art that other types of motors, such as hydraulic, pneumatic, etc., can be used as well as various types of mechanical drive systems.

Figure 6:
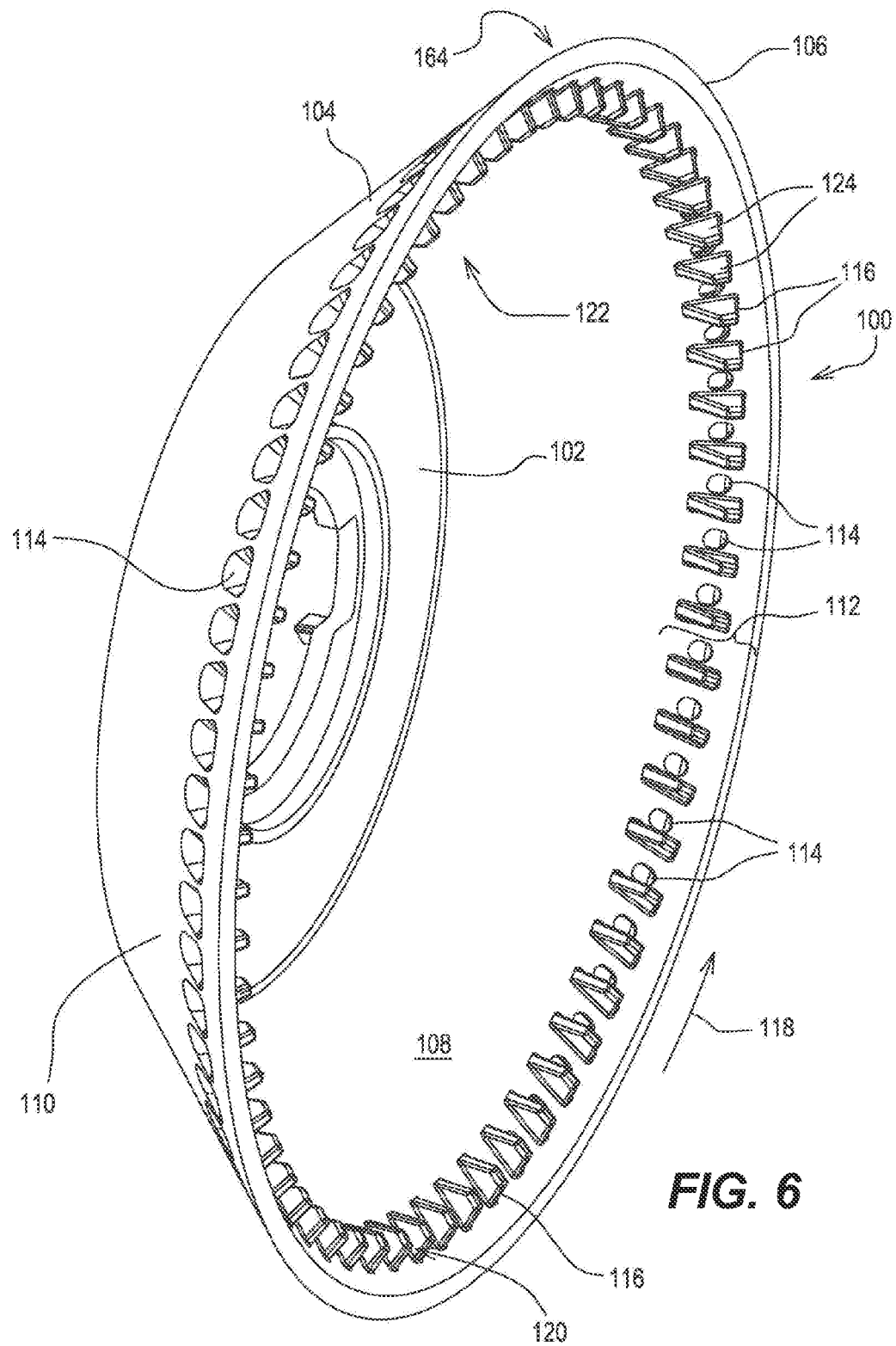
FIG. 6 is a perspective view of the metering member of FIG. 4.
Figure 9:
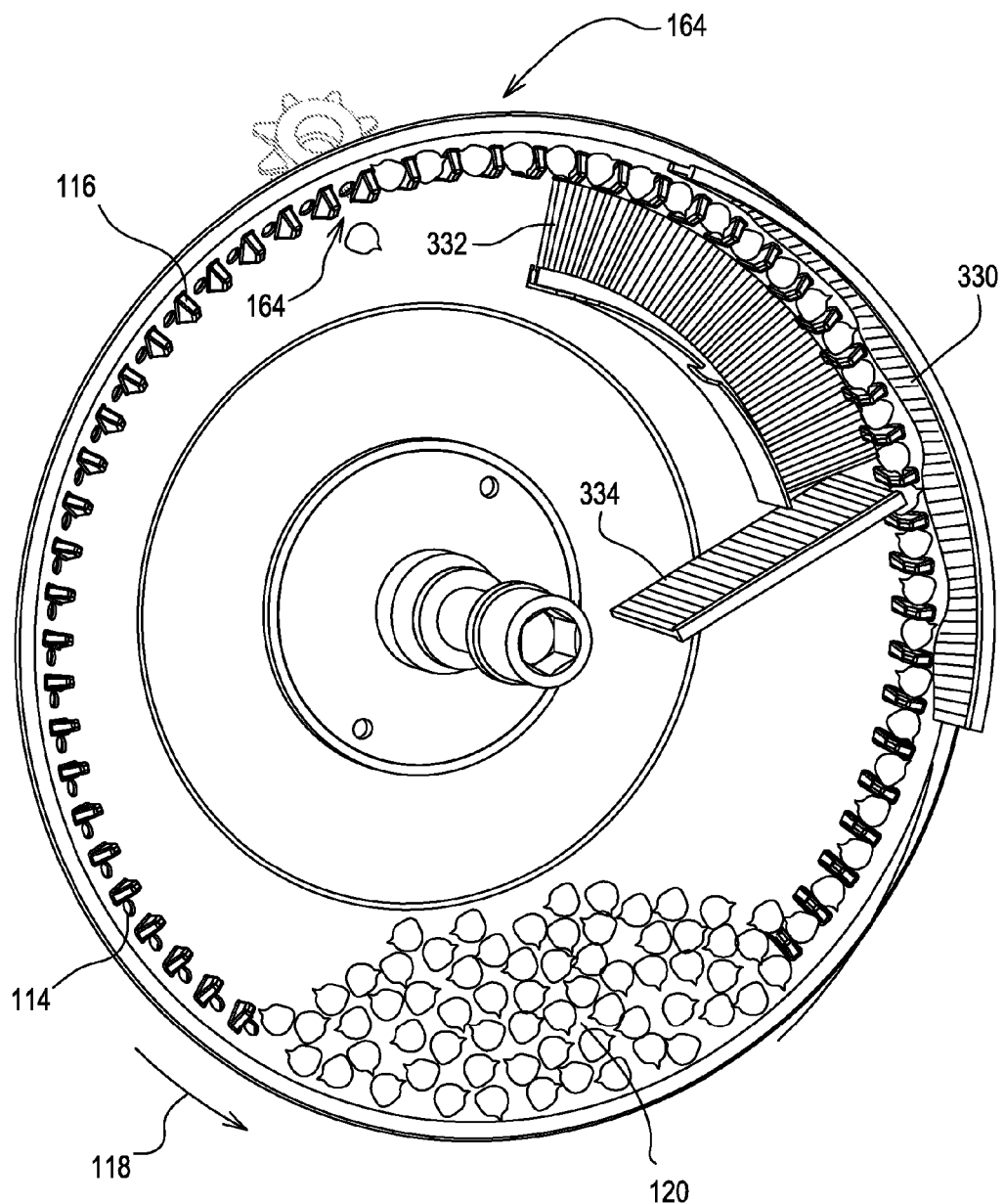
FIG. 9 is an elevational view of the inside of the metering member of FIG. 6.

With reference to FIGS. 6 and 7, a metering member 100 of the seed meter is shown in greater detail. The metering member 100 illustrated is shown as a single piece, concave bowl shaped body. The bowl shaped body has a base portion 102 from which extends a sidewall 104. Sidewall 104 terminates in an outer edge 106. The sidewall has a radially inner surface 108 and a radially outer surface 110. Adjacent the outer edge 106, the sidewall has a rim portion 112 shown by the bracket in FIG. 6. The rim portion 112 extends radially outwardly and axially toward the outer edge 106. In the rim portion 112 is an annular array of apertures 114 that extend through the sidewall between the inner and outer surfaces 108 and 110. The metering member 100 is mounted in the meter housing for rotation in the direction of the arrow 118 in FIG. 6. In operation, as the metering member rotates, individual seeds from a seed pool 120 located at a bottom portion of the metering member are adhered to the apertures 114 on the inner surface 108 of the sidewall and sequentially carried upward to a release position 164 at an upper portion of the metering member 100. Thus, the inner surface is also known as the seed side of the metering member.

The base portion 102 of the metering member contains a central drive aperture 130 (FIG. 5) used to mount the metering member on a rotational drive hub 56 for rotation about the axis 132 in a manner similar to mounting a flat seed disk in a seed meter, as is well known. A flat seed disc is shown and described in greater detail in U.S. Pat. No. 9,686,905, the entire contents of which is incorporated by reference, and which is equally suitable as metering member 100.

As the metering member rotates as shown by arrow 118 (FIG. 6), seed is moved to a release position 164 at the upper portion of the metering member. The release position is slightly past the top or 12 O'clock position on the circular path of travel of the seed such that the seed is moving somewhat downward at the release position. This facilitates the seed's entry into the delivery system as more fully described herein. Also, by being past the top point of the path, the delivery system is off center relative to the metering member providing clearance between the delivery system and the seed meter drive. At the release position 164, the inner surface of the rim portion of the metering member is facing downward such that seed is adhered beneath the metering member or hangs from the metering member (see FIG. 10). The seed delivery system 400 is also positioned beneath the upper portion of the metering member at the release position 164 to take the seed from the metering member as shown in FIG. 10.

Figure 10:
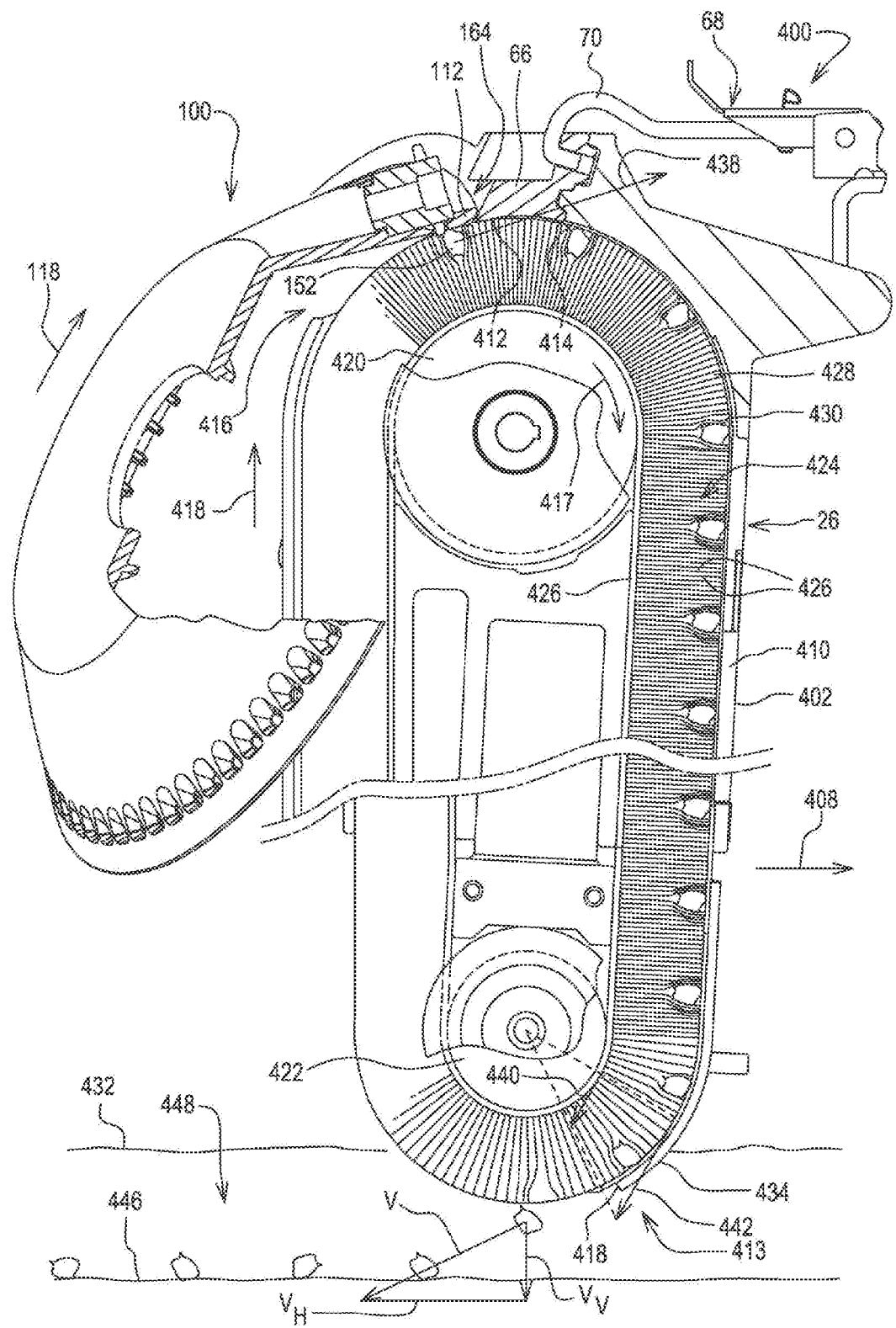
FIG. 10 is a side sectional view of the metering member and seed delivery system.

With further reference to FIG. 10, delivery system 400 includes a housing 402 having a left sidewall 404 (see FIG. 2) and a right sidewall 406 (see FIG. 3). The terms left and right are used in relationship to the direction of travel of the seeding machine shown by the arrow 408. Connecting the left and right sidewalls to one another is an edge wall 410. An upper opening 416 is formed in the edge wall and sidewalls to allow seed to enter into the housing 402. A lower opening 418 is provided at the lower end forming a discharge location 413 for the seed. A pair of pulleys 420 and 422 are mounted inside the housing 402. The pulleys support a belt 424 for rotation within the housing. One of the two pulleys is a drive pulley while the other is an idler pulley. The belt has a flexible base member 426 to engage the pulleys. In particular, the base member has a first side with a traction surface and second side opposite the first side. The second side defines a mounting surface that has a length and a width. The second side of the base member engages the pulleys 420, 422. As discussed in greater detail herein, elongated bristles 428 extend from the mounting surface of the base member 426. In some aspects distal, or radially outer, ends 430 of the bristles touch or are close to touching the inner surface of the housing edge wall 410.

Once the seed is captured or trapped in the bristles 428, the delivery system controls the movement of seed from the seed meter to the discharge location. The bristles hold the seeds to limit the movement of the seeds relative to the base member or to one another. Various constructions of the bristles limit the movement of the seeds relative to the base member and to one another in various degrees. The seeds may be held in the bristles such that the seeds are limited in movement vertically, horizontally or otherwise relative to the bristles 428 or relative to other seeds in the delivery system. For example, during travel of the seeds along the vertical side of the delivery system, the seeds may be held on at least the top and bottom thereof to limit or prevent any relative movement between the seed and the brush belt. In other or alternative aspects, the bristles may limit the movement of the seeds by holding, with varying degrees of constraint, the seeds on one or more sides thereof. Thus, the changes in relative position of the seeds to one another due to dynamics of the planting unit while moving across a field is minimized. The seed is carried or conveyed by the bristles from the upper opening 416 to the lower opening 418 with the movement of the seed controlled at all times from the upper opening to the lower opening.

The lower opening 418 of the delivery system housing is positioned as close to the bottom 446 of the seed trench or furrow 448 as possible. The housing edge wall 410 forms an exit ramp 434 at the lower opening 418. The lower opening 418 and the ramp 434 are positioned along the curve in the belt path around the pulley 422. The seed, being carried by the bristles' distal ends, increases in linear speed around the pulley 422 as the distal ends of the bristles travel a greater distance around the pulley 422 than does the base member 426 of the belt. This speed difference is shown by the two arrows 440 and 442.

At discharge, the seed has a velocity shown by the vector V. This velocity has a vertical component VV and a horizontal component VH. The belt is operated at a speed to produce a horizontal velocity component VH that is approximately equal to, but in the opposite direction of, the seeding machine forward velocity shown by arrow 408. As a result, the horizontal velocity of the seed relative to the ground is zero or approximately zero. This minimizes rolling of the seed in the seed trench. In other or alternative aspects, control of the transfer of the seed to a resting position in the trench may be accomplished successfully using other methods.

Figure 11:
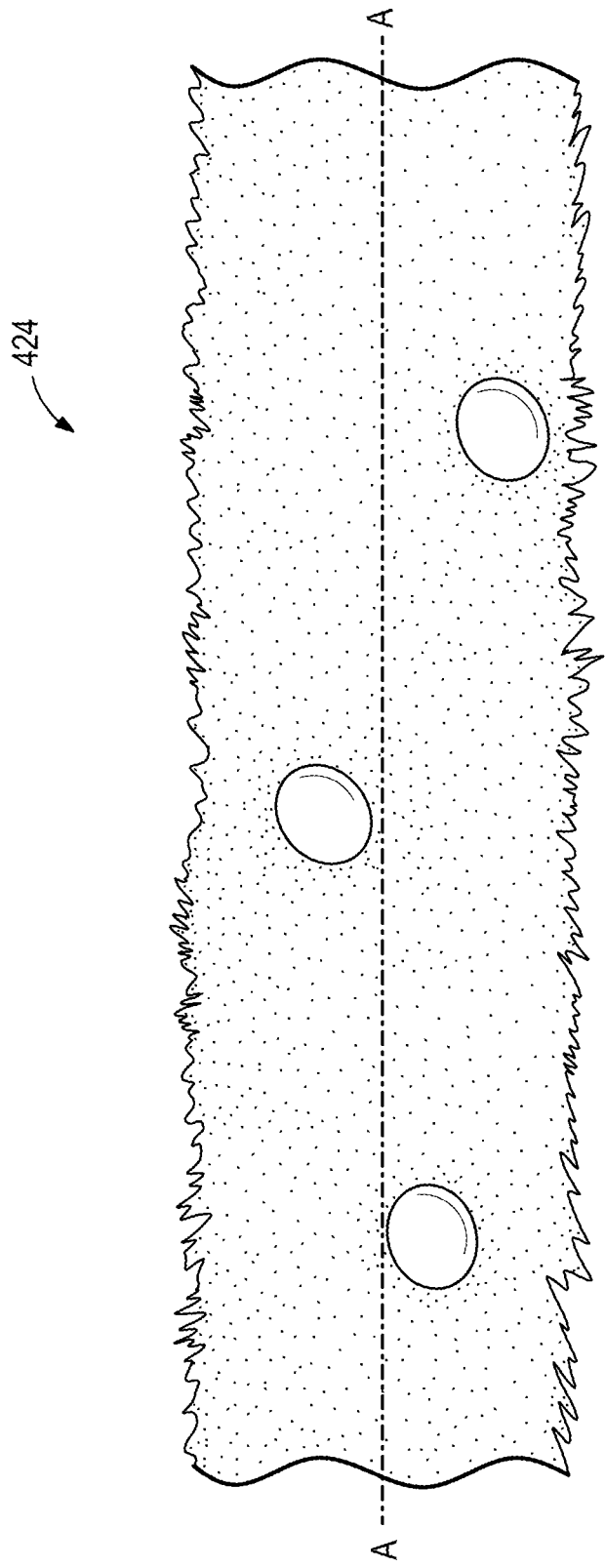
FIG. 11 is an elevational view of the brush belt of the delivery system.

Ideally, as shown in FIG. 11, seeds should be transferred to the brush belt 424 in the center (e.g., along the longitudinal axis A) of the brush belt. When seeds are transferred to either side of the center the seeds may not be released from the exit ramp 434 with the appropriate trajectory to be properly positioned in the furrow 448. The aspects of brush belts that follow help to facilitate the transfer of seed to the center of the brush belt, and also help to prevent slippage (e.g., relative movement) of the seed along the length of the brush belt.

With specific reference to FIGS. 12-16A, the plurality of bristles 528(a)-(f) are coupled to the mounting surface 527(a)-(f) and a length of the bristles 528(a)-(f) are different. As shown, repeating patterns are created by the bristles 528(a)-(f) of these aspects. Moreover, the plurality of bristles 528(a)-(f) are arranged in rows that extend between opposite edges of the mounting surface 527(a)-(f). As shown, the bristles 528(a)-(f) within each row (which are shown extending into the page) are aligned and are also the same length. The lengths of the bristles 528(a)-(f) are measured from the traction surface 527(a)-(f) of the base member 526(a)-(f) to the distal end 530(a)-(f) thereof.

With specific reference to FIGS. 12-13B, the plurality of bristles 528(a)-(f) are arranged in first sections 544(a)-(c) that define a first length L1, and second sections 548(a)-(c) that define a second length L2. The second length L2 is greater than the first length L1. In the illustrated aspect the first length L1 is about 6.5 mm and the second length L2 is about 14.5 mm. In other words, the first length L1 is less than 50% of the second length. In other or additional aspects, the first length L1 may range from 25% to 98% of the second length. For example, in some aspects the first length L1 may be 25%, 30%, 35%, 40%, 45%, 50%, 55%, 60%, 75%, 80%, 90%, 95%, or 98% of the second length L2. In other aspects, the first length may be smaller than the second length by other suitable percentages. In other or additional aspects, the second length L2 may range from 5 mm to 25 mm. For example, in some aspects the second length L2 may be 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, or 25 mm. In other aspects, the second length L2 may have other suitable lengths. The first sections 544(a)-(c) and the second sections 548(a)-(c) alternate along the length of the brush belt 524(a)-(c) (e.g., along the longitudinal axis) such that the brush belt 524(a)-(c) has different stiffnesses along the length of the brush belt 524(a)-(c). In each of the aspects of FIGS. 12-16A, the first sections 544(a)-(c) create valleys and the second sections 548(a)-(c) create peaks.

In the aspect illustrated in FIGS. 12 and 12A, all of the bristles 528(a) of the first section 544(a) have the same first length L1 and all of the bristles 528(a) of the second section 548(a) have the same second length L2. Accordingly, the brush belt 524(a) has bristles 528(a) with discrete length differences and the sections 544(a), 548(a) create a square or step wave relative to the mounting surface 527(a) when viewed from the side (e.g., from one of the edges 574(a) of the mounting surface 527(a)). FIGS. 12 and 12A illustrate that the second length L2 of the bristles 528(a) of the second section 548(a) is at least 6 mm greater than the first length L1 of the bristles 528(a) of the first section 544(a). In other or alternative aspects, the difference between the second length L2 of the second section 548(a) and the first length L1 of the bristles 528(a) of the first section 544(a) may be greater or less than 6 mm (e.g., 1 mm, 2 mm, 3 mm, 4 mm, 5 mm, 6 mm, 7 mm, 8 mm, 9 mm, 10 mm, or any other suitable length). As shown in FIGS. 12 and 12A, within each section 544(a), 548(a), the distal ends 530(a) of the bristles 528(a), collectively, create a planar surface. There is a resulting rectangular gap 552(a) between adjacent second sections 548(a) (e.g., adjacent peaks).

As shown in FIGS. 13-13B, the lengths of the bristles 528(b), (c) continuously increase from the first length L1 to the second length L2. In the aspects illustrated in FIGS. 13 and 13A, the plurality of bristles 528(b) are coupled to the mounting surface and the distal ends 530(b) of the bristles 528(b) collectively define an undulating surface profile along a length of the brush belt 524(b). As shown, each of the first sections 544(b) defines a relative minimum bristle length 554(b) (e.g., a local minimum or trough point) and each of the second sections 548(b) defines a relative maximum bristle length 556(b) (e.g., a local maximum or peak point). As shown in FIGS. 13 and 13A, the lengths of the bristles 528(b) of the first sections 544(b) gradually decrease from an adjacent second section 548(b) to the trough point 554(b) along the length of the base member 526(b) and the lengths of the bristles 528(b) of the first sections 544(b) gradually increase from the trough point 554(b) to an adjacent second section 548(b) along the length of the base member 526(b). Similarly, the lengths of the bristles 528(b) of the second sections 548(b) gradually increase from an adjacent first section 544(b) to the peak point 556(b) along the length of the base member 526(b) and the lengths of the bristles 528(b) of the second sections 548(b) gradually decrease from the peak point 556(b) to an adjacent first section 544(b) along the length of the base member 526(b). As shown in FIGS. 13 and 13A, collectively, the distal ends 530(b) of the bristles 528(b) of each of the first and second sections 544(b), 548(b) create an arcuate surface. That is, the distal ends 530(b) of the bristles 528(b) of each first section 544(b) create a convex surface, and the distal ends 530(b) of the bristles 528(b) of each second section 548(b) create a concave surface. Also, the resulting gap 552(b) between adjacent second sections 548(b) (e.g., adjacent peak points) is defined, in part, by the convex surfaces of the first sections 544(b) (e.g., trough points or valleys).

In the aspect illustrated in FIG. 13B, the bristles 528(c) of each of the first sections 544(c) have the same length L1. The length of the bristles 528(c) of each of the second sections 548(c) increase from an adjacent first section 544(c) to the second length L2 and decrease from the second length L2 to another adjacent first section 544(c). As shown in FIG. 13B, collectively, the distal ends 530(c) of the bristles 528(c) of each of the first and second sections 544(c), 548(c) create a planar surface. A trapezoidal gap 552(c) results between adjacent second sections 548(c) (e.g., adjacent peaks).

In the aspects illustrated in FIGS. 14 and 14A, the lengths of the bristles 528(d) gradually increase to the second length L2. The distal ends 530(d), collectively, of the bristles 528(d) create an inclined surface.

In the aspect illustrated in FIGS. 15-16A, the bristles 528(e)-(f) are arranged in brush elements 558(e)-(f) (e.g., bristle clusters or groups of bristles). In the aspects of FIGS. 15-16A, the bristles 528(e)-(f) of each brush element 558(e)-(f) are directly coupled to the mounting surface 527(e)-(f) of the base member 526(e)-(f), but in other aspects, the bristles may be coupled to a brush pad (not shown), which is coupled to the mounting surface 527(e)-(f) of the base member 526(e)-(f).

In the aspects illustrated in FIGS. 15 and 15A, within each brush element 558(e), the bristles 528(e) of the first sections 544(e) have lengths that gradually decrease from the second length L2 to the first length L1 and the bristles 528(e) of the second sections 548(e) have lengths that gradually increase from the first length L1 to the second length L2. Within each brush element 558(e), the distal ends 530(e) of the bristles 528(e) of the first and second sections 544(e), 548(e) create inclined surfaces. A triangular gap 552(e) results between adjacent first and second sections 544(e), 548(e). Also, a rectangular gap 564(e) results between adjacent spaced brush elements 558(e). As shown in FIGS. 15 and 15A, the triangular gap 552(e) between the first and second sections 544(e), 548(e) has a first depth H1 and the rectangular gaps 564(e) between adjacent brush elements 558(e) have a second depth H2 that is greater than the first depth H1.

In the aspect of FIGS. 16-16A, the brush element 558(f) includes a first section 544(f) of bristles 528(f), a second section 548(f) of bristles 528(f) coupled to one side of the first section 544(f), and a third section 562(f) of bristles 528(f) coupled to an opposite side of the first section 544(f). The bristles 528(f) of the first sections 544(f) of the brush elements 558(f) all have the same first length L1 and the bristles 528(f) of the second and third sections 548(f), 562(f) of the brush elements 558(f) all have the same second length L2. Also, within each brush element 558(f), the distal ends 530(f) of the bristles 528(f) of both the first, second, and third sections 544(f), 548(f), 562(f) create planar surfaces, and a rectangular gap 552(f) exists between the second and third sections 548(f), 562(f). Also, a rectangular gap 564(f) exists between adjacent brush elements 558(f). As shown in FIGS. 16 and 16A, the rectangular gaps 552(f) between adjacent second and third sections 544(f), 562(f) of the brush elements 558(f) have a first depth H1 and the rectangular gaps 564(f) between adjacent brush elements 558(f) have a second depth H2 that is greater than the first depth H1.

FIGS. 17-22 show brush belts 624, 724(a)-(f), 824(a)-(c) having differing stiffness by varying other parameters of the bristles 628, 728(a)-(f) rather than varying the length of the bristles 628, 728(a)-(f). In the aspect of FIGS. 17 and 17A, the brush elements 658 each have bristles 628 coupled to the base member 626 such that the bristles 628 create a variable thickness within each brush element 658, but lengths of the bristles 628 within each brush element 658 are substantially the same. In other words, the brush elements 658 define a first thickness T1 near the base member 626 and a second thickness T2 at the distal ends of the brush element 658. The second thickness T2 is greater than the first thickness T1. The brush elements 658 may be constructed such that the bristles 628 within each brush element 658 create other shapes, as well. For example, the bristles 628 within each brush element 658 may create umbrella-shaped brush elements, T-shaped brush elements, trapezoidal-shaped brush elements, or brush elements having bristles that form any other suitable shape.

As shown in FIGS. 18-22, the brush belts 724(a)-(f) include at least one first section 770(a)-(f) of bristles and at least one second section 772(a)-(f) of bristles. The first sections 770(a)-(f) of bristles in FIGS. 18-21 have bristles 772(a)-(f) with cross-sections that have a first dimension D1 along the length of the bristle, and the second sections 772(a)-(f) of bristles 728(a)-(f) have bristles with cross-sections that have a second dimension D2 along the length of the bristle. In the aspects illustrated in FIGS. 18-21, the bristles 728(a)-(f) have a circular cross-section and therefore the first and second dimensions D1, D2 are diameters of the bristles 728(a)-(f). In other or alternative aspects, the bristles 728(a)-(f) may have any suitable cross-section (e.g., triangular, rectangular, pentagonal, hexagonal, heptagonal, octagonal, or any other polygonal shape) and therefore the first and second dimensions D1, D2 may be the widths of the bristles 728(a)-(f) or may represent the greatest cross-sectional dimension of the bristles. The second dimension D2 is less than the first dimension D1. The first dimension D1 may range from 0.1 mm to 2 mm, and the second dimension D2 may be 5% to 90% of the first dimension D1. For example, in some aspects the first cross-sectional dimension D1 may be 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, or 2 mm. For example, in some aspects the first cross-sectional dimension D1 may be 5%, 10%, 15%, 20%, 25%, 30%, 35%, 40%, 45%, 50%, 55%, 60%, 75%, 80%, or 90% of the second cross-sectional dimension D2. In yet other aspects, the first cross-sectional dimension D1 may have any suitable values and the second dimension D2 may be any suitable percentage of the first dimension D1.

With particular reference to the brush belt 724(a)-(b) of FIGS. 18-18B, the first and second sections 770(a)-(b), 772(a)-(b) extend along the length (e.g., parallel to the longitudinal axis A). The first sections 770(a)-(b) of bristles 728(a)-(b) are positioned on opposite sides of the base member (not shown in FIGS. 18-18B), and the second section 772(a)-(b) of bristles is positioned between the first sections 770(a)-(b). As shown, the first sections 770(a)-(b) of bristles 728(a)-(b) abut opposite edges 774(a) of the mounting surface. In the aspect of FIG. 18A, the dimensions of the bristles 728(a) of the first sections 770(a) are greatest near the edges 774(a) of the base member and the dimensions of the bristles 728(a) of the first sections 770(a) gradually decrease from the edges 774(a) of the base member towards the second section 772(a). In other words, the dimensions of the bristles 728(a) continuously decrease from the edges 774(a) to the center of the mounting surface (not shown in FIGS. 18-18A). In another aspect, the dimensions of the bristles 728(a) of the first sections 770(a) may be smallest near the edges 774(a) of the base member and the dimensions of the bristles 728(a) of the first sections 770(a) gradually increase from the edges 774(a) of the base member towards the second section 772(a). In other words, the dimensions of the bristles 728(a) may continuously increase from the edges 774(a) to the center of the mounting surface (not shown in FIGS. 18-18A). In the aspect of FIG. 18B, the dimensions of the bristles 728(b) of the first sections 770(b) are substantially the same. In other words, there is a discrete difference in the dimensions of the bristles 728(b) of the sections 770(b), 772(b). In both FIGS. 18A and 18B, the dimensions of the bristles 728(a)-(b) of the second section 772(a)-(b) are substantially the same. FIGS. 18A and 18B illustrate that the first cross-sectional dimension D1 of the bristles 728(a)-(b) of the first section 770(a)-(b) is 10% to 95% greater than the second cross-sectional dimension D2 of the bristles 728(a)-(b) of the second section 772(a)-(b). For example, in some aspects the first cross-sectional dimension D1 may be 10%, 15%, 20%, 25%, 30%, 35%, 40%, 45%, 50%, 55%, 60%, 75%, 80%, 90%, or 95% greater than the second cross-sectional dimension D2. In yet other aspects, the first cross-sectional dimension D1 may be greater than the first dimension D1 by other suitable percentages. In another aspect (not pictured), the bristles of each section may have dimensions that are variable and random. Also, in the aspects of FIGS. 18A and 18B, the bristles 728(a)-(b) of both the first sections 770(a)-(b) and second sections 772(a)-(b) are staggered relative to one another. In other or additional aspects, the bristles of one or both sections may be aligned with one another, rather than staggered. In the illustrated aspect, the width of the mounting surface of the base member measures 5 mm to 20 mm. Each of the first sections 770(a) may take up about 2% to 33% of the width of mounting surface and the second section 772(a) take may take up the remaining width of the mounting surface. In other or additional aspects, the widths and percentages of the first and second sections 770(a), 772(a) may be greater or smaller. For example, in some aspects the width of the mounting surface of the base member may be 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, or 20 mm. In other aspects, the mounting surface may have other suitable widths. As another example, each of the first sections 770(a) may take up about 2%, 5%, 10%, 15%, 20%, 25%, 30% or 33% of the width of mounting surface and the second section 772(a) may take up the remaining width of the mounting surface. In other aspects, the first section 770(a) may take up other amounts of the width of the mounting surface, with the second section 772(a) may take up the remaining width of the mounting surface.

Figure 19:
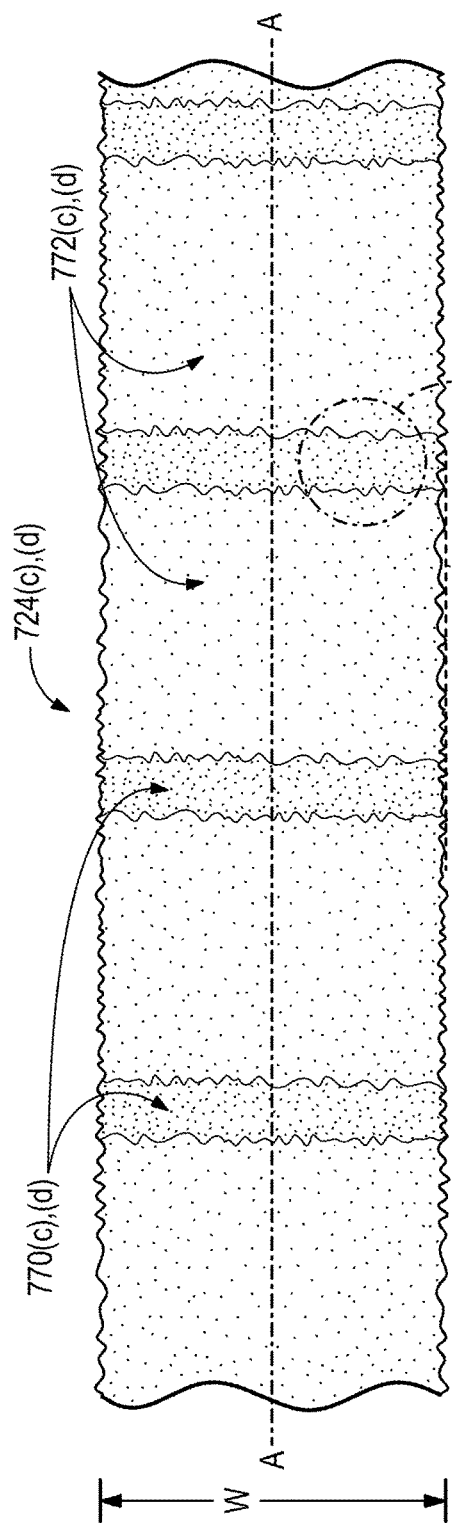
FIG. 19 is an elevational view of a brush belt for the delivery system according to another aspect.

Each of the brush belts 724(c)-(e) of FIGS. 19-20 have a plurality of first sections 770(c)-(e) of bristles 728(c)-(e) and a plurality of second sections 772(c)-(e) of bristles 728(c)-(e). The plurality of first sections 770(c)-(e) and the plurality of second sections 772(c)-(e) alternate along the length of the mounting surface of the base member 724(c)-(e). So, each of the plurality of first sections 770(c)-(e) is between two of the plurality of second sections 772(c)-(e), and each of the plurality of section sections 772(c)-(e) is between two of the plurality of first sections 770(c)-(e). In the aspect of FIGS. 19-21, each of the plurality of first sections 770(c)-(e) and second sections 772(c)-(e) of bristles extends along the width W of the base member of the brush belt 724(c)-(e). That is, each of the plurality of first and second sections 770(c)-(e), 772(c)-(e) extends between opposite edges 774(c)-(e) of the base member. In the aspect of FIGS. 19-19B, the plurality of first sections 770(*c*) and second sections 772(*c*) are oriented perpendicular to the longitudinal axis A, but in the aspect of FIG. 20 the first sections 770(*e*) are oriented at a non-perpendicular angle relative to the longitudinal axis A. Accordingly, as shown in FIG. 20, edges of the second sections 772(*e*) are also oriented at a non-perpendicular angle relative to the longitudinal axis A. Moreover, as shown in FIG. 20, the first sections 770(*e*) create V-shapes along the length of the base member, although in other or additional aspects, the first sections 770(*e*) may have different orientations than that shown herein. As noted above, in the illustrated aspects, the width of the mounting surface of the base member measures 5 mm to 20 mm. The first sections 770(*c*)-(*e*) may be spaced apart from one another by 5 mm to 50 mm. For example, the first sections 770(*c*)-(*e*) may be spaced apart from one another by 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, 30 mm, 31 mm, 32 mm, 33 mm, 34 mm, 35 mm, 36 mm, 37 mm, 38 mm, 39 mm, 40 mm, 41 mm, 42 mm, 43 mm, 44 mm, 45 mm, 46 mm, 47 mm, 48 mm, 49 mm or 50 mm. In other aspects, the first sections 770(*c*)-(*e*) may be spaced from one another by other suitable distances. Also, each of the first sections 770(*c*)-(*d*) may have a length along the longitudinal axis A of 5% to 100% the length of each of the second sections 772(*c*)-(*d*). For example, each of the first sections 770(*c*)-(*d*) may have a length along the longitudinal axis A of 5%, 10%, 15%, 20%, 25%, 30%, 35%, 40%, 45%, 50%, 55%, 60%, 75%, 80%, 90%, 95%, or 100% the length of each of the second sections 772(*c*)-(*d*). In other aspects, the first sections 770(*c*)-(*e*) may have other suitable lengths along the longitudinal axis. That is the length of each of the first sections 770(*c*)-(*d*) may be equal to or less than length of each of the second sections 772(*c*)-(*d*). Each of the first and second sections may also have different lengths (e.g., the lengths of each of the first and second sections 770(*c*)-(*d*), 772(*c*)-(*d*) may not be equal).

Figure 19A:
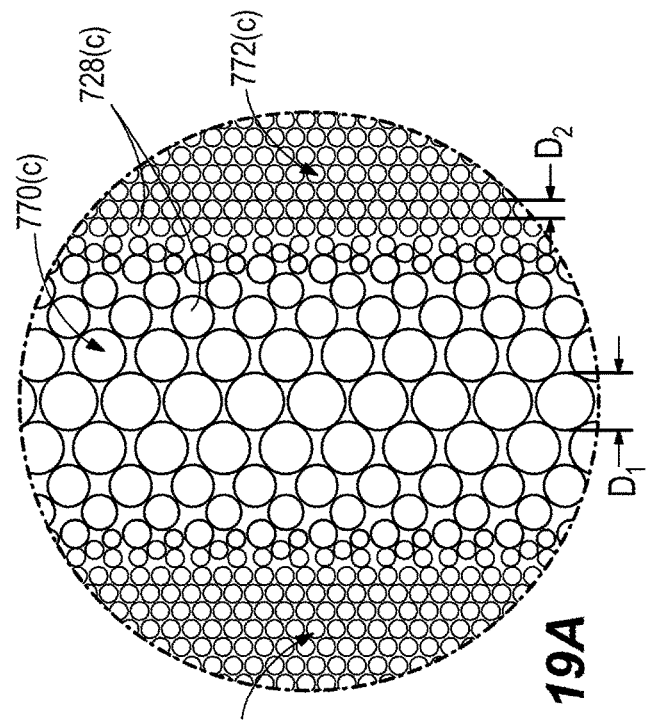
FIG. 19A is enlarged view of a portion of the brush belt of FIG. 19 illustrating an exemplary arrangement of the bristles of the brush belt.
Figure 19B:
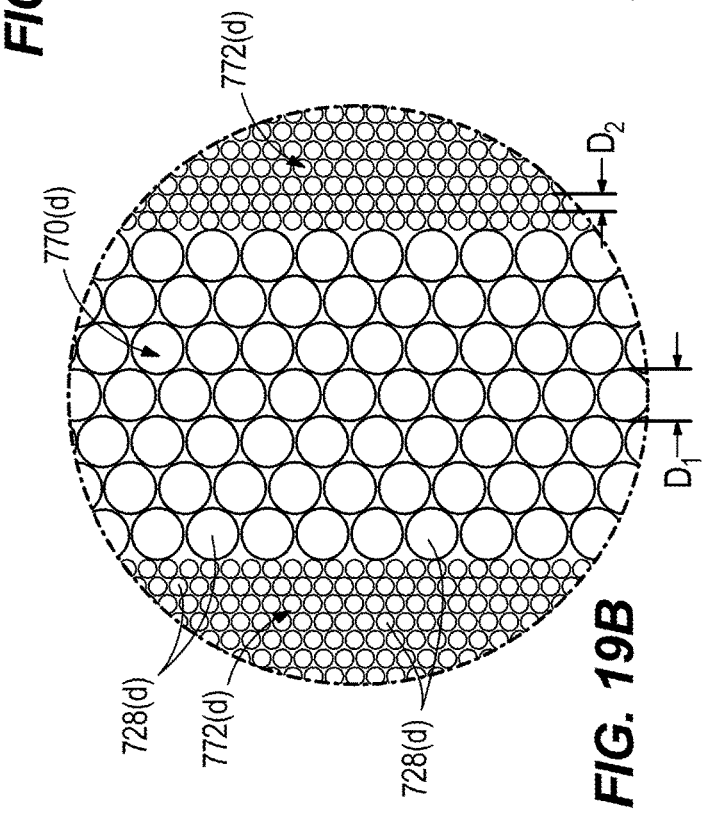
FIG. 19B is an enlarged view of a portion of the brush belt of FIG. 19 illustrating another exemplary arrangement of the bristles of the brush belt.

In the aspect of FIG. 19A, the dimensions of the bristles 728(*c*) of the first sections 770(*c*) are greatest in the center of first sections 770(*c*) and the dimensions of the bristles 728(*c*) of the first sections 770(*c*) gradually decrease from the center of the first sections 770(*c*) towards the adjacent second sections 772(*c*). In other words, the dimensions of the bristles 728(*c*) continuously decrease from the edges 774(*c*) to the center of the mounting surface. In another aspect, the dimensions of the bristles 728(*c*) of the first sections 770(*c*) are smallest in the center of first sections 770(*c*) and the dimensions of the bristles 728(*c*) of the first sections 770(*c*) gradually increase from the center of the first sections 770(*c*) towards the adjacent second sections 772(*c*). In other words, the dimensions of the bristles 728(*c*) may continuously increase from the edges 774(*c*) to the center of the mounting surface. In the aspect of FIG. 19B, the dimensions of the bristles 728(*d*) of the first sections 770(*d*) are substantially the same. In other words, there is a discrete difference in the dimensions of the bristles 728(*d*) of the sections 770(*d*), 772(*d*). In both FIGS. 19A and 19B, the dimensions of the bristles 728(*c*)-(*d*) of the second sections 772(*c*)-(*d*) are substantially the same. FIGS. 19A and 19B illustrate that the first cross-sectional dimension D1 of the bristles 728(*c*)-(*d*) of the first section 770(*c*)-(*d*) may range from 0.1 mm to 2 mm, and the second dimension D2 may be 5% to 90% of the first dimension D1. For example, in some aspects the first dimension D1 may be 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, or 2 mm. For example, in some aspects, the second dimension may be 10%, 15%, 20%, 25%, 30%, 35%, 40%, 45%, 50%, 55%, 60%, 65%, 70%, 80%, 85%, or 90% of the first dimension D1. In yet other aspects, the first cross-sectional dimension D1 may have any suitable values and the second dimension D2 may be any suitable percentage of the first dimension D1. Also, in the aspects of FIGS. 19A and 19B, the bristles 728(*c*)-(*d*) of both the first sections 770(*c*)-(*d*) and second sections 772(*c*)-(*d*) are staggered relative to one another. In other or additional aspects, the bristles of one or both sections may be aligned with one another, rather than staggered. The dimensions and orientations of the bristles 728(*c*)-(*d*) of the first and second sections of FIGS. 19A and 19B are applicable to the dimensions and orientations of the bristles 728(*e*) of the first sections 770(*e*) and second sections 772(*e*) of the aspect shown in FIG. 20 as well.

Figure 22:
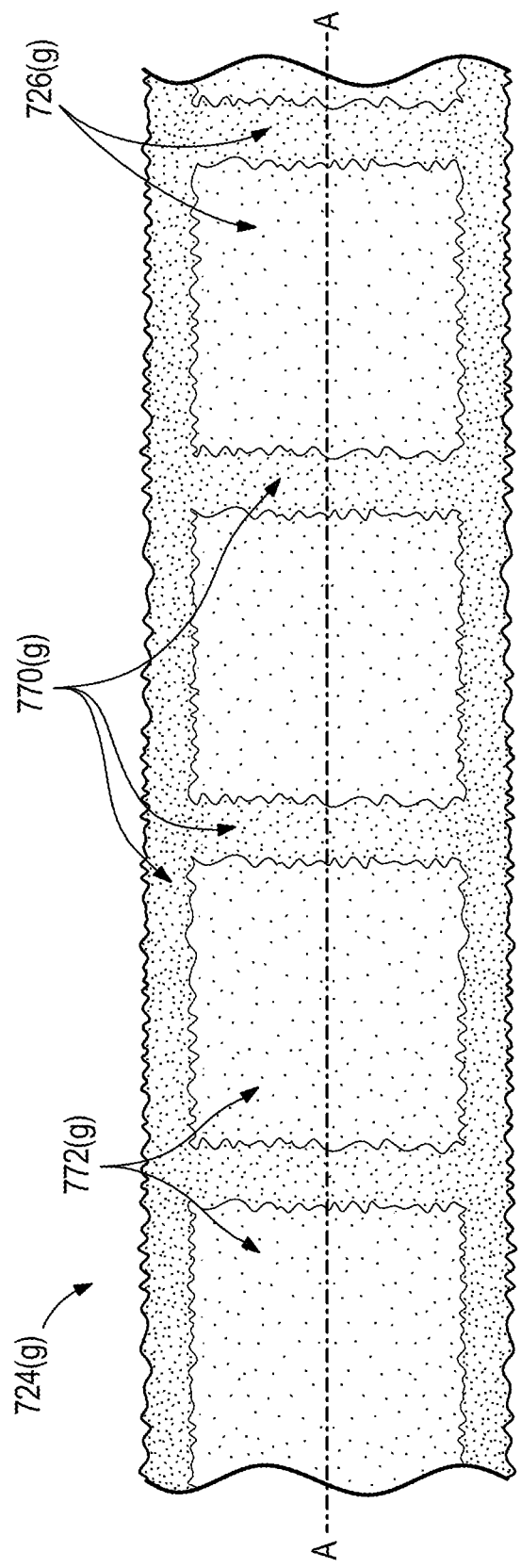
FIG. 22 is an elevational view of a brush belt for the delivery system according to another aspect.
Figure 26:
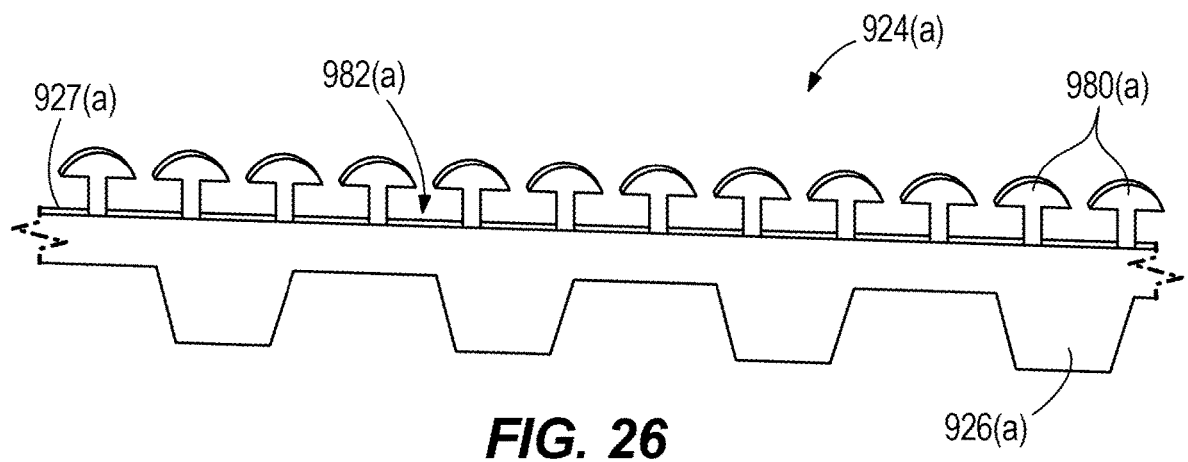
FIG. 26 is a side view of a brush belt for the delivery system according to another aspect.
Figure 27:
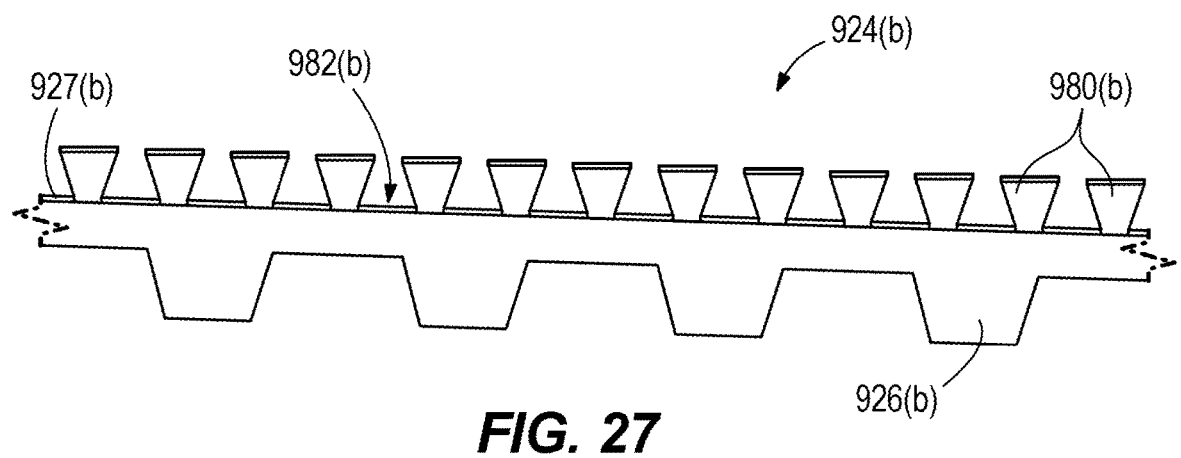
FIG. 27 is a side view of a brush belt for the delivery system according to another aspect.

In the aspect of FIGS. 21 and 22, the brush belts 724(*f*), 724(*g*) include bristle sections that extend both longitudinally and laterally relative to the mounting surfaces (not shown). With respect to FIGS. 21, the brush belt 724(*f*) has a first section 770(*f*) of bristles 728(*f*) that extends in a serpentine pattern along the length of the base member (not shown in FIG. 21). In other or additional aspects, the first sections 770(*f*) may create curvilinear patterns, arcuate patterns, sinusoidal patterns, etc. The dimensions and orientations of the bristles 728(*f*) of the first sections 770(*f*) and second sections 772(*f*) of FIGS. 19A and 19B are applicable to the dimensions and orientations of the bristles 728(*f*) of the first sections 770(*f*) and second sections 772(*f*) of the aspect shown in FIG. 21. With respect to FIG. 22, the bristles 728(*g*) of the brush belt 724(*g*) include longitudinal sections 770(*g*) that extend along the length (e.g., parallel to the longitudinal axis A) and lateral sections 770(*g*) that alternate along the length of the mounting surface of the base member 724(*g*) thereby creating central sections 772(*g*) therebetween. The concepts discussed above with respect to FIGS. 18-20 apply to FIG. 22. That is, the longitudinal sections 770(*g*) and the lateral sections 770(*g*) may include varying bristles of different dimensions (e.g., diameters) and sizes. Also, the central section 772(*g*) may have bristles that are smaller in dimension than those in the longitudinal sections 770(*g*) and lateral section 770(*g*)

In other or additional aspects, the bristles 824(*a*)-(*c*) may be coupled at any suitable angle relative to the base member 826(*a*)-(*c*). For example, as shown in FIGS. 23-25, the bristles 824(*a*)-(*c*) are coupled to brush pads 860(*a*)-(*c*). As shown in FIGS. 23-24, the brush pads 860(*a*)-(*b*) may be coupled at an angle relative to the base member 826(*a*)-(*b*). In the illustrated aspect, the brush pads 860(*a*)-(*c*) may be coupled across the width of the mounting surface 827(*a*)-(*c*). That is, a first end of the brush pad 860(*a*)-(*c*) is coupled next to one edge of the mounting surface 827(*a*)-(*c*) and the second end of the brush pad 860(*a*)-(*c*) is coupled next to the opposite edge of the mounting surface 827(*a*)-(*c*). As shown, the bristles 828(*a*)-(*c*) may be positioned at different angles relative to the brush pad 860(*a*)-(*c*) as well as the base member 826(*a*)-(*c*). In other or additional aspects, the bristles may be directly coupled to the base member and positioned at any suitable angle relative to the base member. Moreover, as shown in FIGS. 23-24, only a portion of each brush element 858(*a*)-(*c*) may be coupled to the base member 826(*a*)-(*c*) and each brush element 858(*a*)-(*c*) may be at least partially supported by an adjacent brush element 858(*a*)-(*c*). Also, the bristles 828(*a*)-(*c*) can be positioned in the center (FIG. 23), at a distal end (FIGS. 24-25), at both distal ends or along the length of the brush pads 860(a)-(c). The brush pads 860(a)-(c) may also have configurations and shapes other than rectangular. With particular respect to FIG. 25, the brush pads 860(c) are substantially Z-shaped such that a first or bottom portion 876 of the brush pad 860(c) is coupled to the base member 826(c) and the top or second portion 878 of the brush pad 860(c) may be coupled to or free to move (e.g., slide) relative to an adjacent brush pad 860(c).

Figure 40:
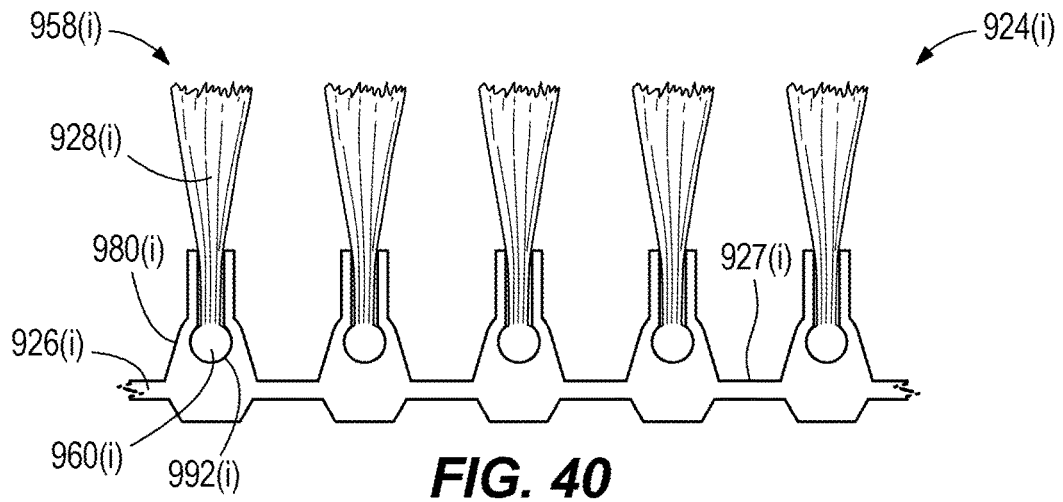
FIG. 40 is a side view of a brush belt for the delivery system according to another aspect.
Figure 41:
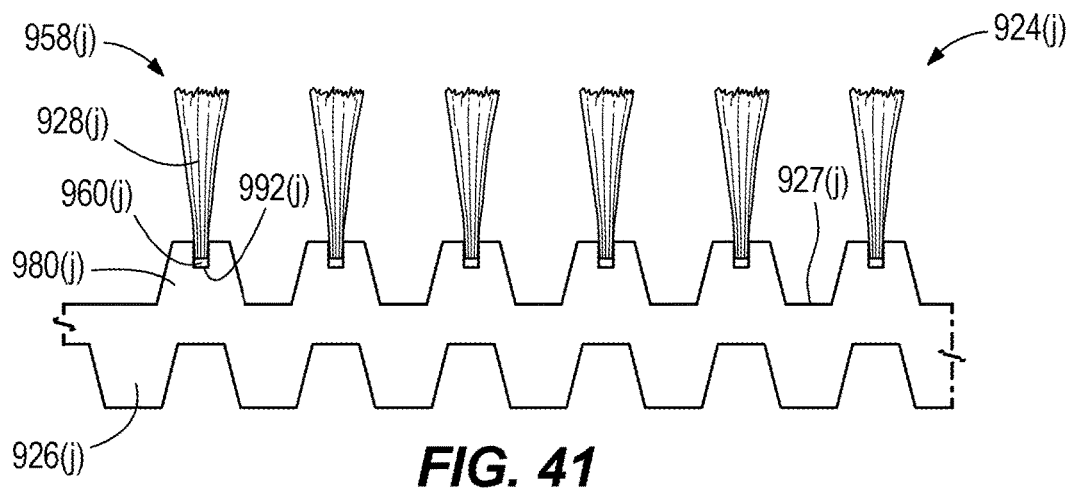
FIG. 41 is a side view of a brush belt for the delivery system according to another aspect.

The brush belts 924(a)-(k) of the aspects in FIGS. 26-42 have base members 926(a)-(k) with other configurations for effectively coupling bristles 928(a)-(k) or brush elements 958(a)-(k) to the base members 926(a)-(k). The use of the base members 926(a)-(k) helps to adjust the length of the bristles 928(a)-(k) relative to the base member 926(a)-(k). As shown in FIGS. 26-42 the base members 926(a)-(k) have projections 980(a)-(k) that are integrally formed with and project from the mounting surface 927(a)-(k) of the base members 926(a)-(k). Gaps or spaces 982(a)-(k) extend between adjacent projections 980(a)-(k). In particular, the projections 980(a)-(k) project from the mounting side of the base member 926(a)-(k) and extend along the width of the base members 926(a)-(k). The projections 980(a)-(k) and gaps 982(a)-(k) can be any suitable shape. For example, in FIG. 25 the projections 980(a) are umbrella-shaped, in FIGS. 26-34, 37 and 41 the projections 980(b)-(e), (g), (j) are trapezoidal, in FIGS. 35-39 the projections 980(f), (h) are arcuate (e.g., have arcuate surfaces), in FIGS. 40 and 42 the projections 980(i), (k) are polygonal.

Figure 28:
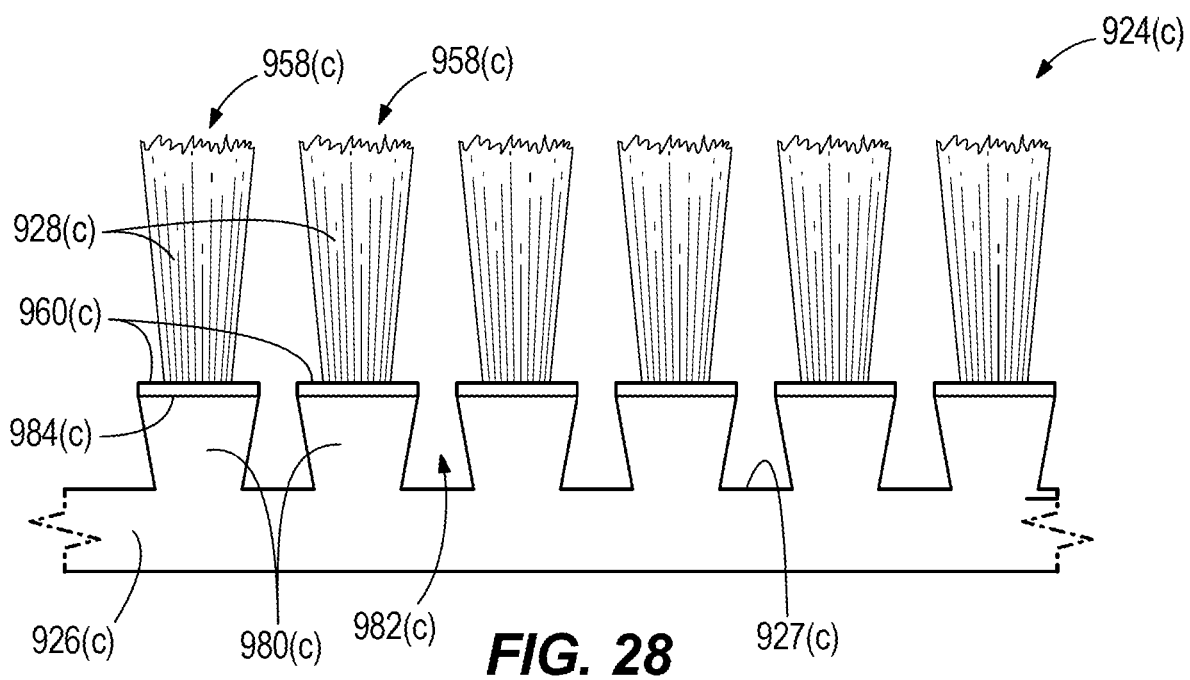
FIG. 28 is a side view of a brush belt for the delivery system according to another aspect.
Figure 29:
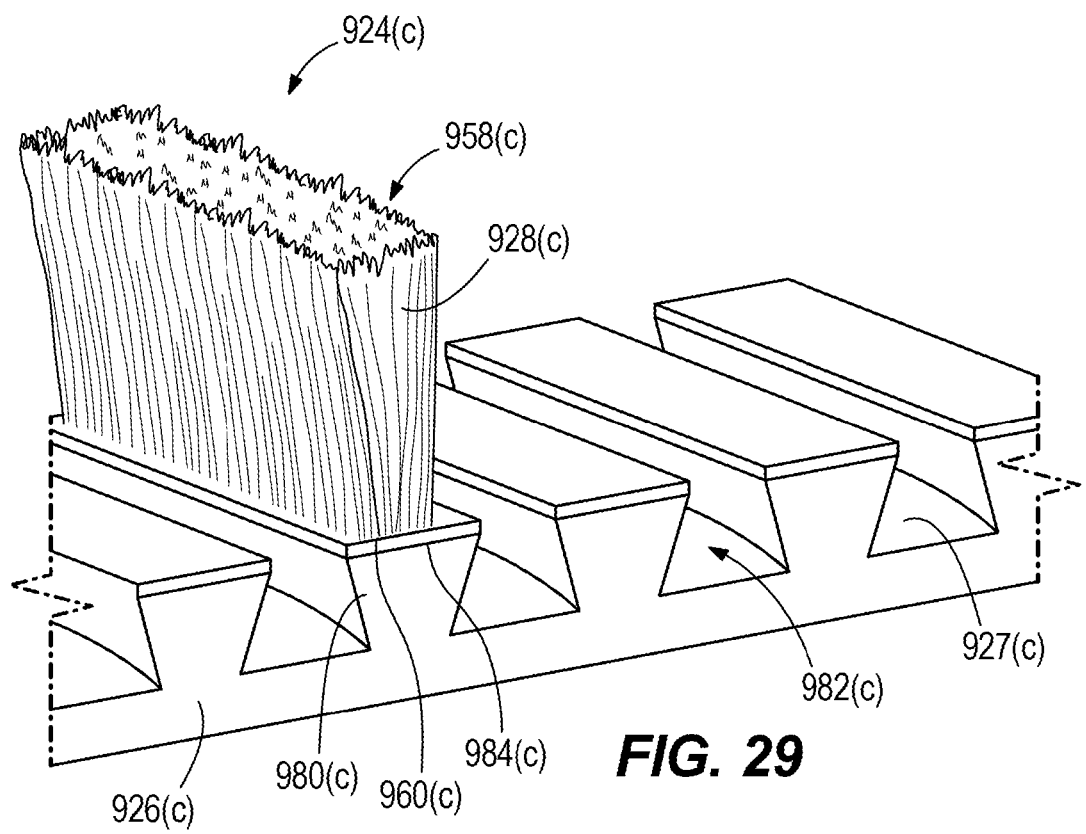
FIG. 29 is a perspective view of the brush belt of FIG. 28.
Figure 30:
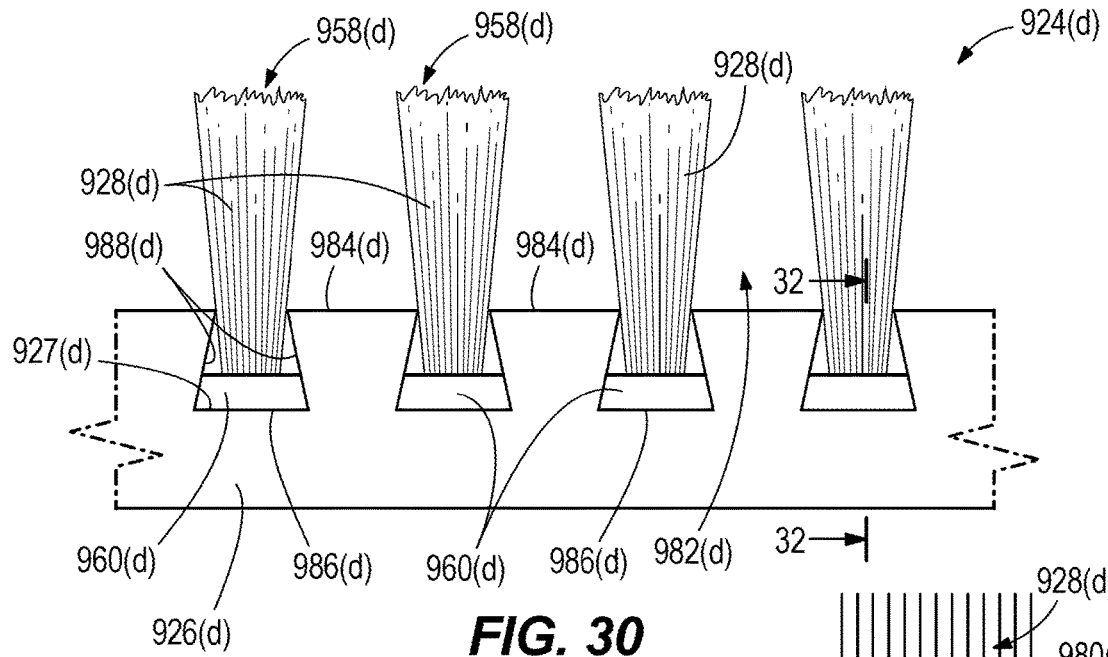
FIG. 30 is a side view of a brush belt for the delivery system according to another aspect.
Figure 32:
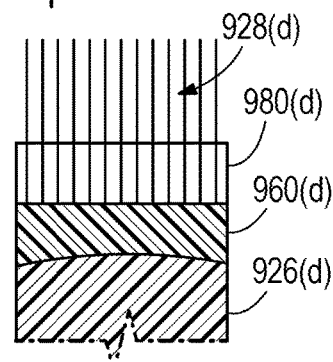
FIG. 32 is a cross-section view of the brush belt along line 32-32 of FIG. 30.
Figure 31:
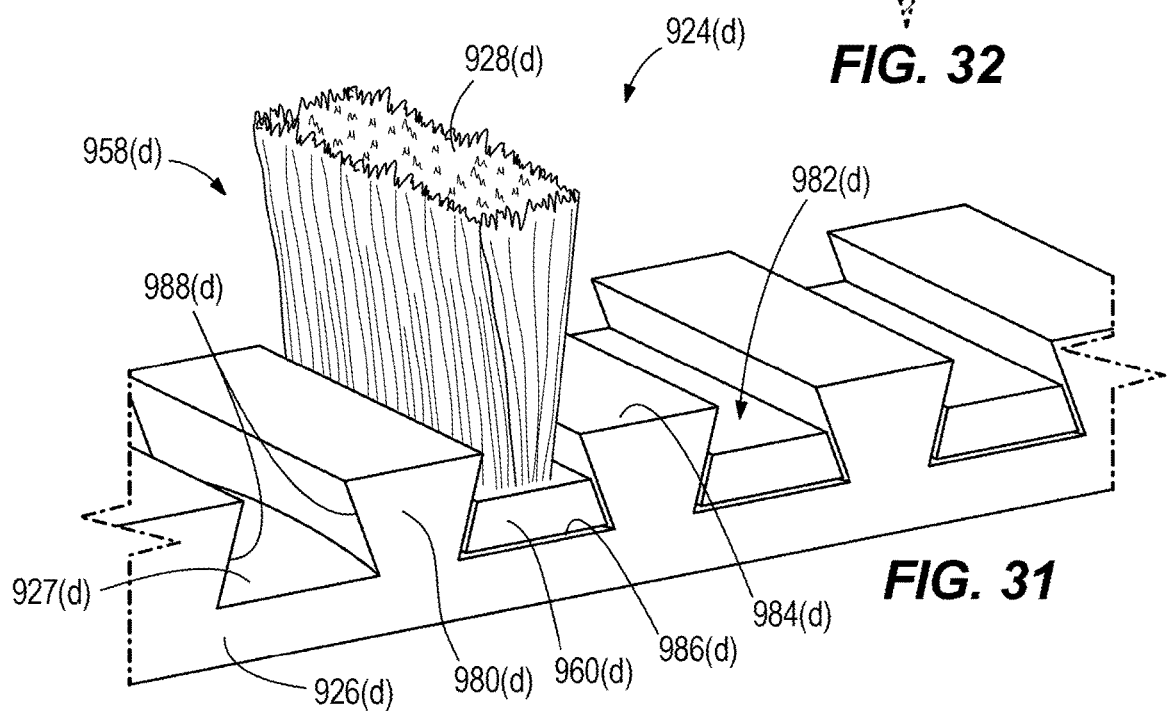
FIG. 31 is a perspective view of the brush belt of FIG. 30.

In FIGS. 28-29, the brush elements 958(c) are coupled, via brush pads 960(c), to outer surfaces 984(c) of the projections 980(c). In other or additional aspects, the bristles 958(c) may be directly coupled (e.g., by adhesive or other suitable coupling mechanism) to the outer surfaces 984(c) of the projections 980(c).

In FIGS. 30-32 and 35-36, one brush element 980(d), (f) is positioned and coupled within a gap 982(d), (f) between each pair of adjacent projections 980(d), (f). In other words, one brush pad 960(d), (f) of the respective brush element 958(d), (f) is coupled to the surface 986(d), (f) between each pair of adjacent projections 980(d), (f). Accordingly, the shapes of the brush pads 960(d), (f) are complementary to the surfaces 988(d), (f) of the adjacent projections 980(d), (f). In other aspects, the brush-pads 960(d), (f) may have other suitable shapes, such as a T-shape.

Figure 33:
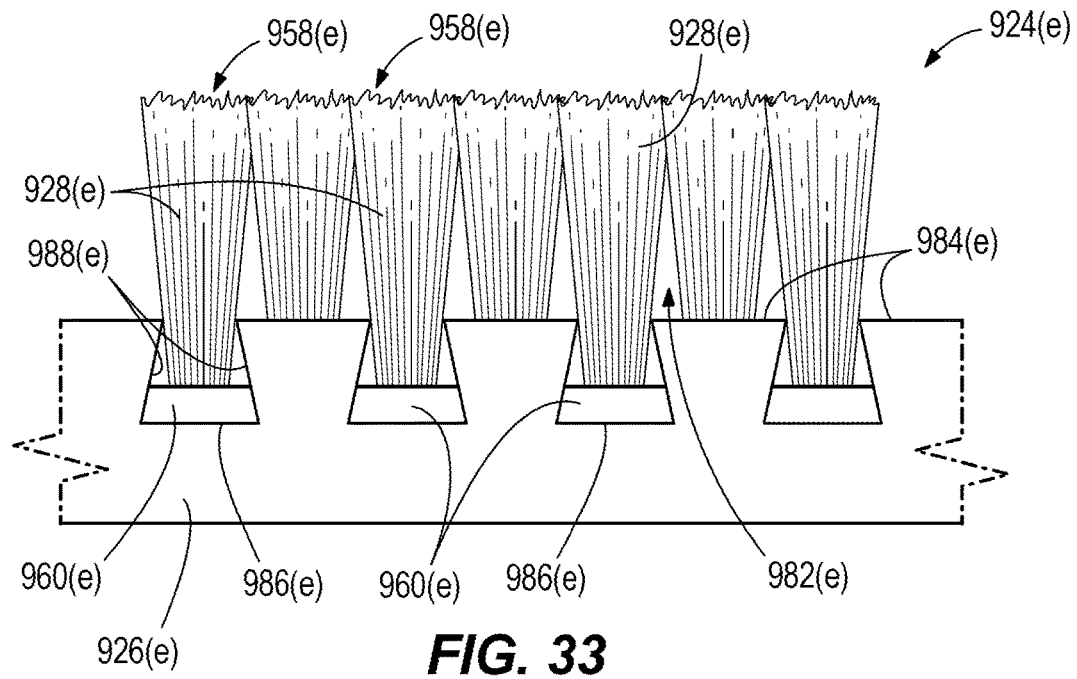
FIG. 33 is a side view of a brush belt for the delivery system according to another aspect.
Figure 34:
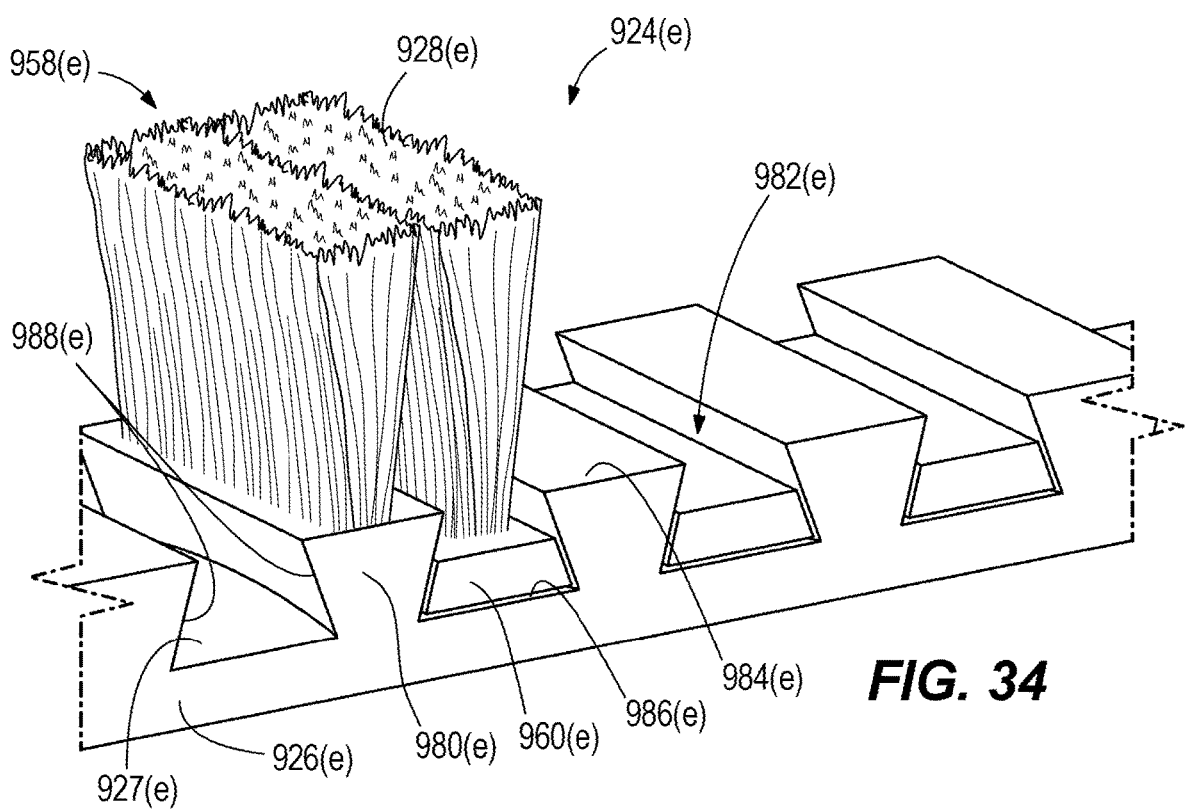
FIG. 34 is a perspective view of the brush belt of FIG. 33.
Figure 35:
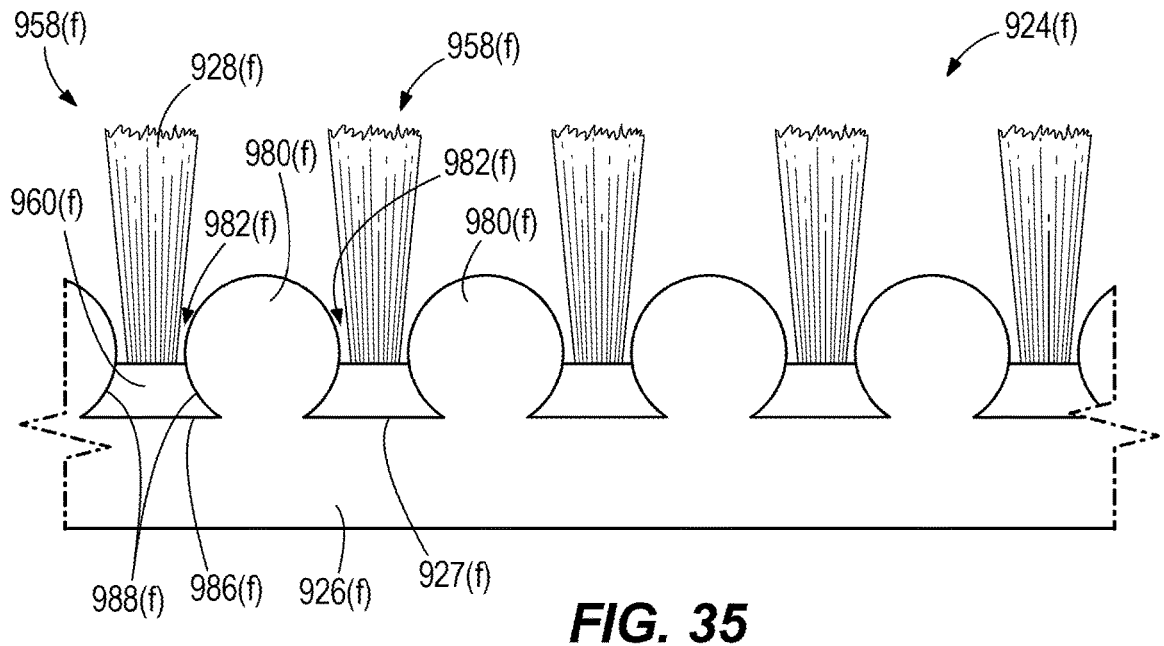
FIG. 35 is a side view of a brush belt for the delivery system according to another aspect.
Figure 36:
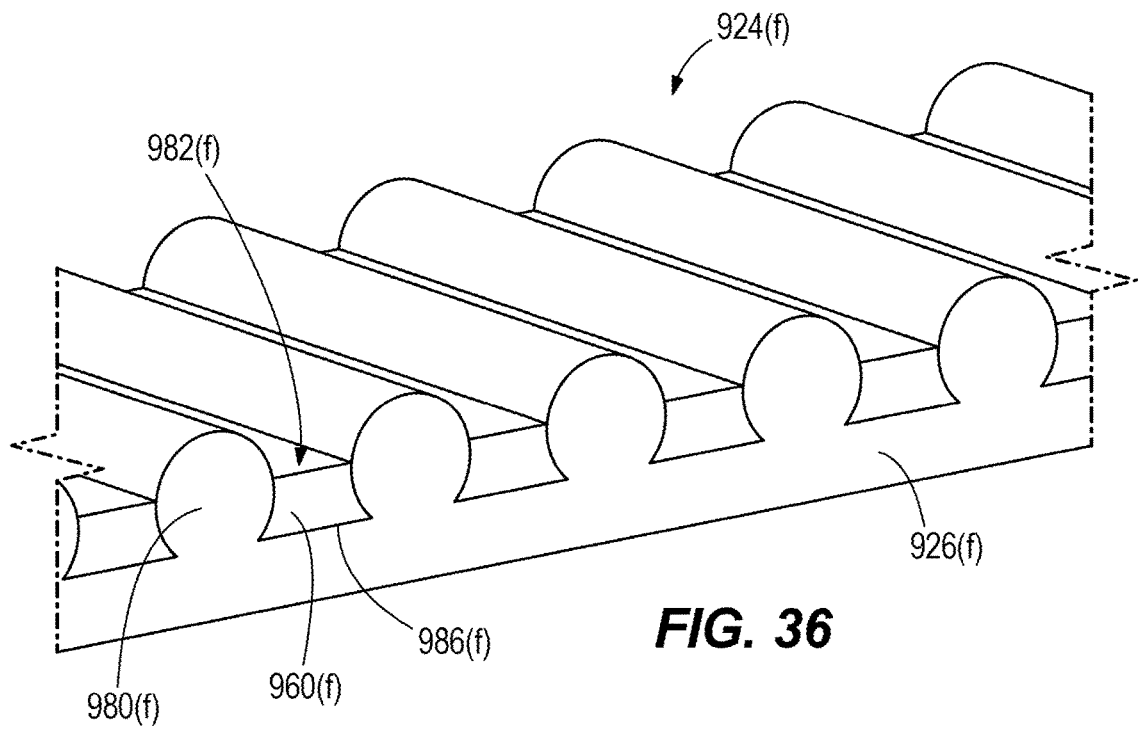
FIG. 36 is a perspective view of the brush belt of FIG. 35.
Figure 38:
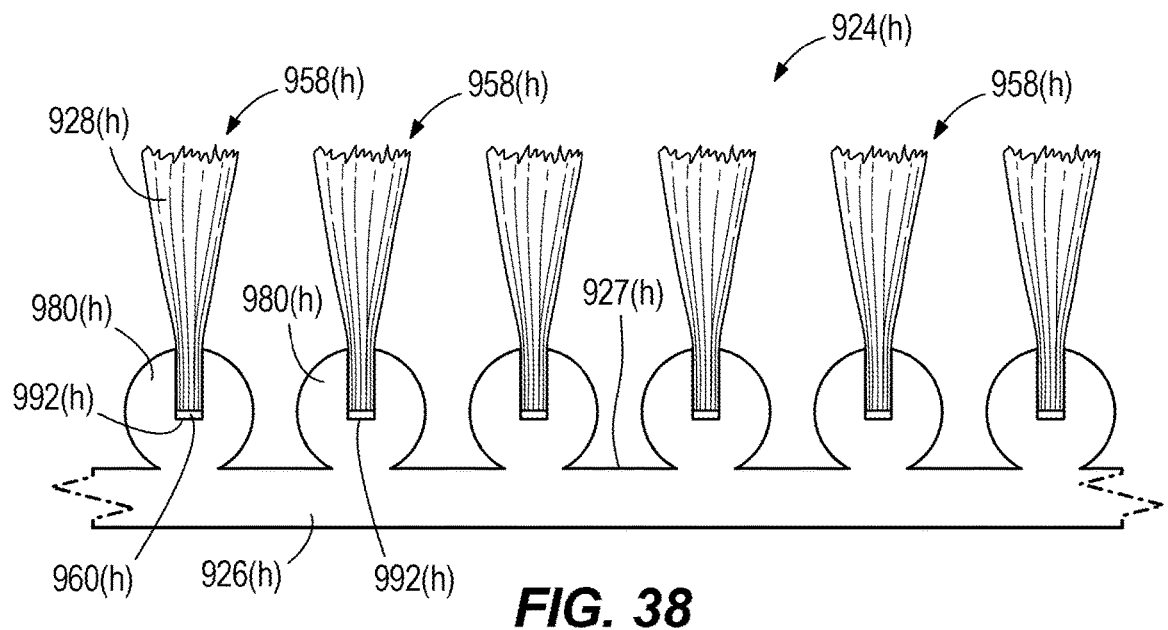
FIG. 38 is a side view of a brush belt for the delivery system according to another aspect.
Figure 39:
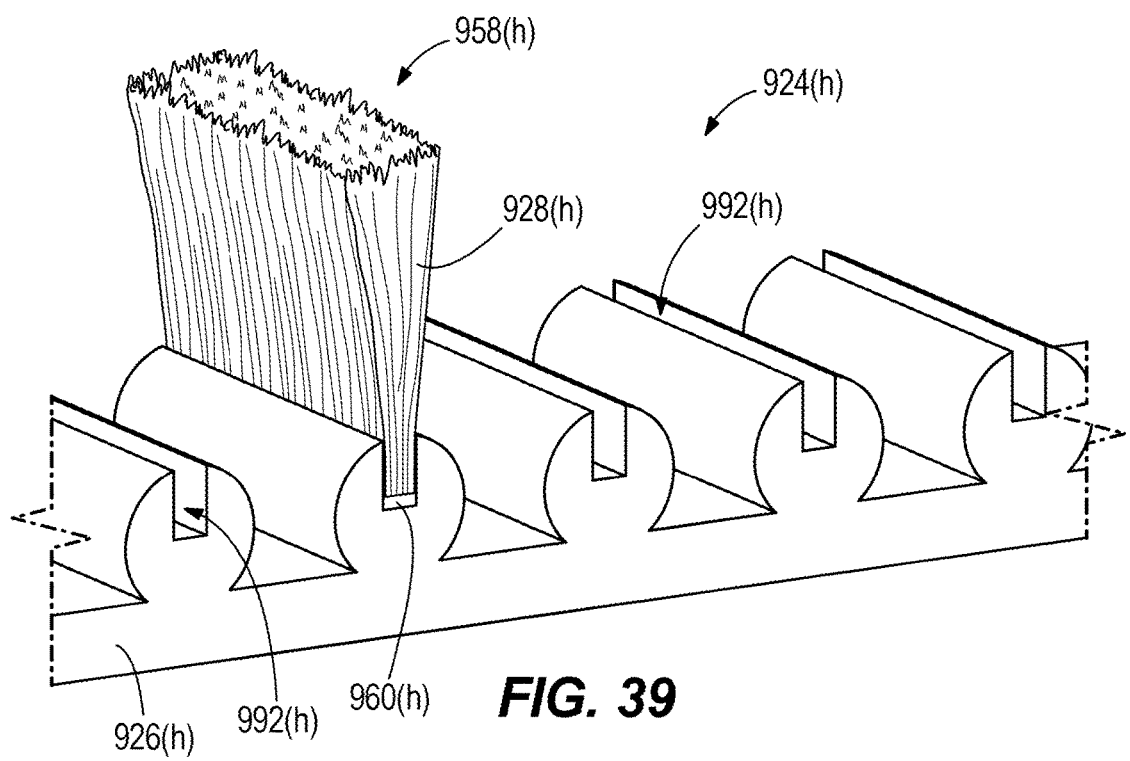
FIG. 39 is a perspective view of the brush belt of FIG. 38.

In FIGS. 33-34, the brush elements 980(e) are coupled to both the outer surfaces 984(e) of the projections 980(e) and between the projections 980(e), as discussed herein with respect to FIGS. 27-32 and 35-36.

To assemble or install the brush elements shown in FIGS. 30-36 into the base member 926(d)-(f), the base member 926(d)-(f) could be wrapped around a pulley (not shown) that is smaller than either of the pulleys 420, 422 such that the size of the gap 982(d)-(f) between two adjacent projections 980(d)-(f) increases and is larger than it will ever be while functioning. Then the brush element 958(d)-(f) is positioned within the enlarged gap. The base member 926(d)-(f) is advanced, which decreases the size of the gap 982(d)-(f) thereby retaining the brush element 958(d)-(f) in compression. This process is repeated to insert a brush element 958(d)-(f) in each gap 982(d)-(f) of the base member 926(d)-(f).

In FIG. 37, the bristles 928(g) are coupled to outer surfaces 984(g) of the projections 980(g) as well as to surfaces 986(g) of the base member 926(g) between adjacent projections 980(g). In other aspects, the bristles may be organized into brush elements and coupled to both the outer surfaces and surfaces between the projections. By coupling the bristles or brush elements to both surfaces, the number of bristles is increased and the length of the bristles is also varied. As shown in FIG. 37, the number of bristles 928(g) coupled to each of the outer surfaces 984(g) is greater than the number of bristles 928(g) coupled to each of the surfaces 986(g) between the projections 980(g). Moreover, reinforcement members 990(g) can be added to and extend through opposite sides of the base member 926(g) to help reinforce the brush belt 924(g), as discussed in greater detail herein. In the illustrated aspect, the reinforcement members extend longitudinally relative to the bae member 926(g).

In FIGS. 38-41, the brush elements 958(h)-(j) are coupled within recesses or slots 992(h)-(j) that extend through the projections 980(h)-(j) of the base member 926(h)-(j). In some aspects (such as FIGS. 40 and 41) the teeth of a double-side synchronous belt form the projections 980(h)-(j) and therefore the recesses 992(h)-(j) are positioned in the teeth. The brush elements 958(h)-(j) may be press-fit within the recesses 992(h)-(j), or the brush elements 958(h)-(j) may be laterally inserted into the recesses 992(h)-(j) and coupled within the recesses 992(h)-(j) via a press-fit or an adhesive. Opposite sides of the recesses 992(h)-(j) help to support the brush elements 958(h)-(j).

Figure 42:
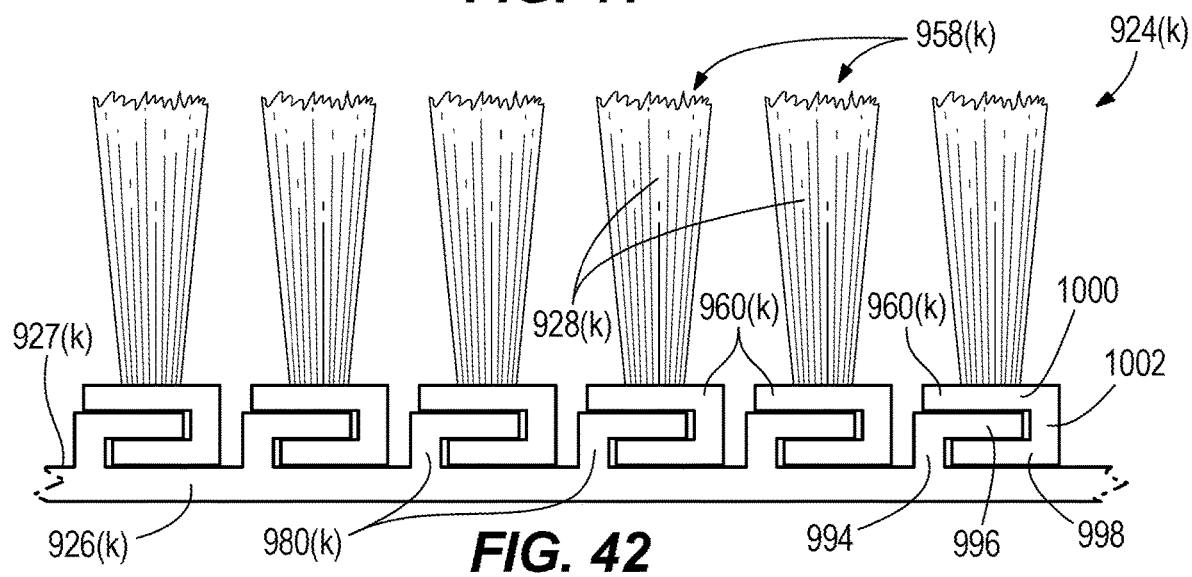
FIG. 42 is a side view of a brush belt for the delivery system according to another aspect.

In FIG. 42, the brush pads 960(k) interlock with the projections 980(k). That is, each of the projection 980(k) includes a first portion 994 that is integrally formed with the base member 926(k) and a second portion 996 that extends from the first portion 994 and is spaced apart from the base member 926(k). The brush pad 960(k) includes a substantially U-shaped body that has first and second portions 998, 1000 that extend from opposite sides of a central portion 1002. As shown, the first portion 996(k) of the brush pad 960(k) is positioned between the second portion 996 of the projection 980(k) and the base member 926(k) and the second portion 1000 of the brush pad 960(k) is positioned above the second portion 996 of the projection 980(k). The bristles 928(k) are coupled to and extend from the second portion 1000 of the brush pad 960(k).

As mentioned briefly herein, the base member is configured to engage pulleys 420, 422 and the bristles and brush elements may be positioned according to the type of pulley being used and where the pulley engages the brush belt. FIGS. 43-48 illustrate pulleys 420, 422 that have first engagement members that are configured to engage second engagement members of the base members.

Figure 43:
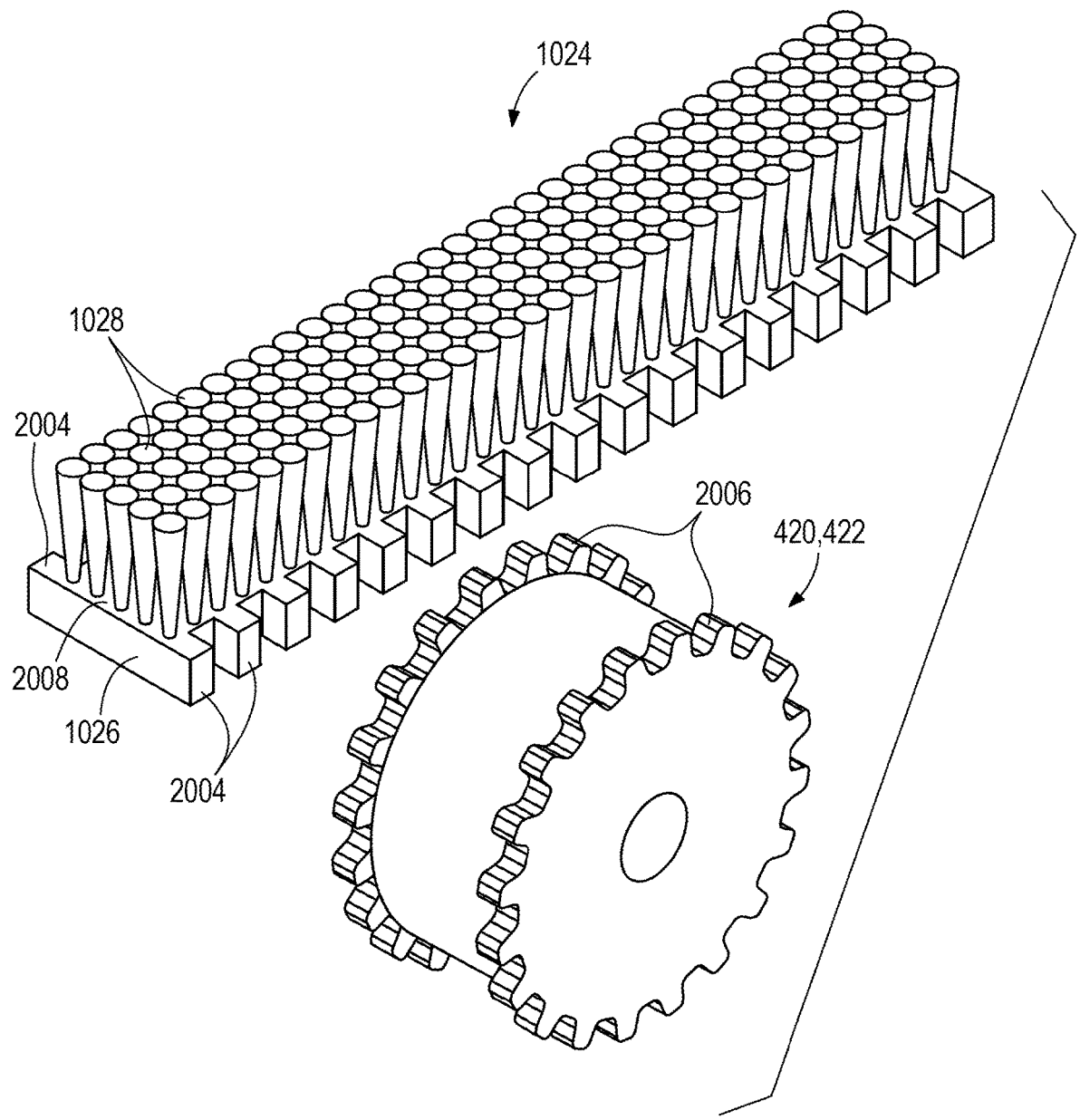
FIG. 43 is a perspective view of a brush belt for the delivery system according to another aspect and a pulley for use with the brush belt.

As shown in FIG. 43, the base member 1026 may have teeth 2004 that engage teeth 2006 of the pulleys 420, 422. In the aspect illustrated in FIG. 43, the base member 1026 has teeth 2004 on opposite sides that engage teeth 2006 on the pulleys 420, 422. As shown, the bristles 1028 are coupled in a central area 2008 of the base member 1026, and not in the area of the teeth 2004. Coupling the bristles 1028 away from the teeth 2004 of the base member 1026 protects the integrity of the base member 1026.

Figure 44:
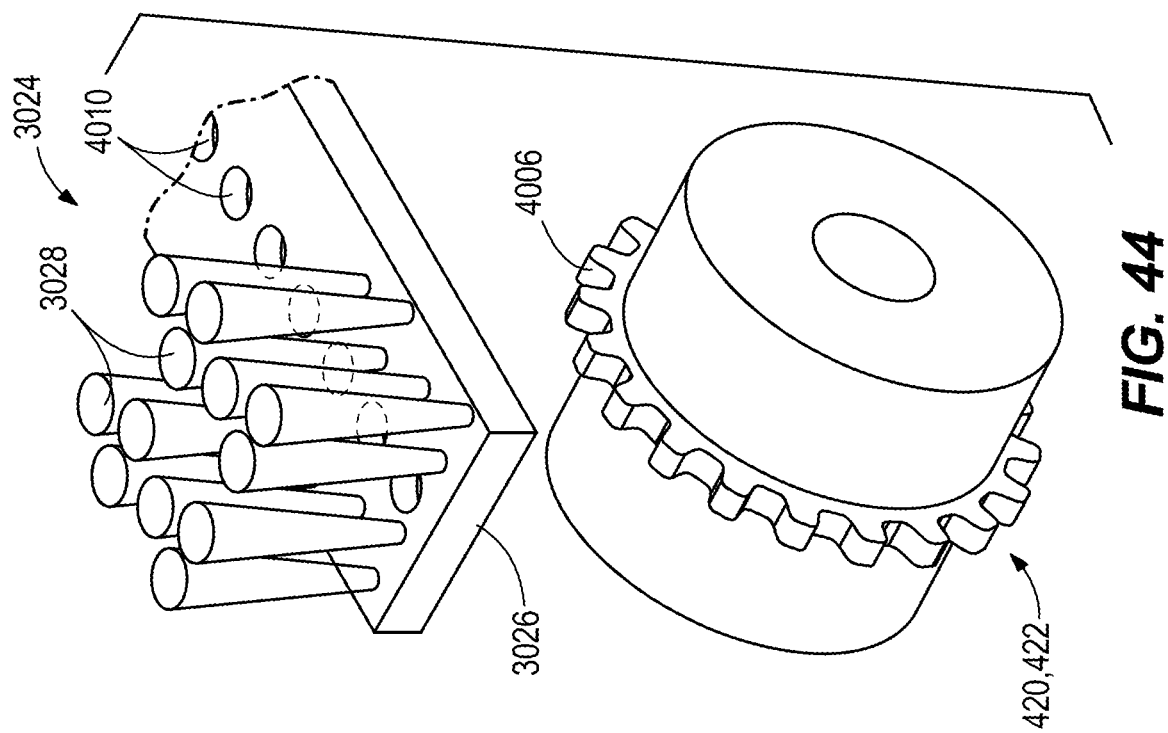
FIG. 44 is a perspective view of a brush belt for the delivery system according to another aspect and a pulley for use with the brush belt.

Alternatively and with respect to FIG. 44, the base member 3026 may have apertures 4010 extending through the base member 3026 that receive teeth 4006 of the pulley 420, 422. The bristles 3028 (or brush elements) are therefore positioned relative to the apertures 4010.

Figure 45:
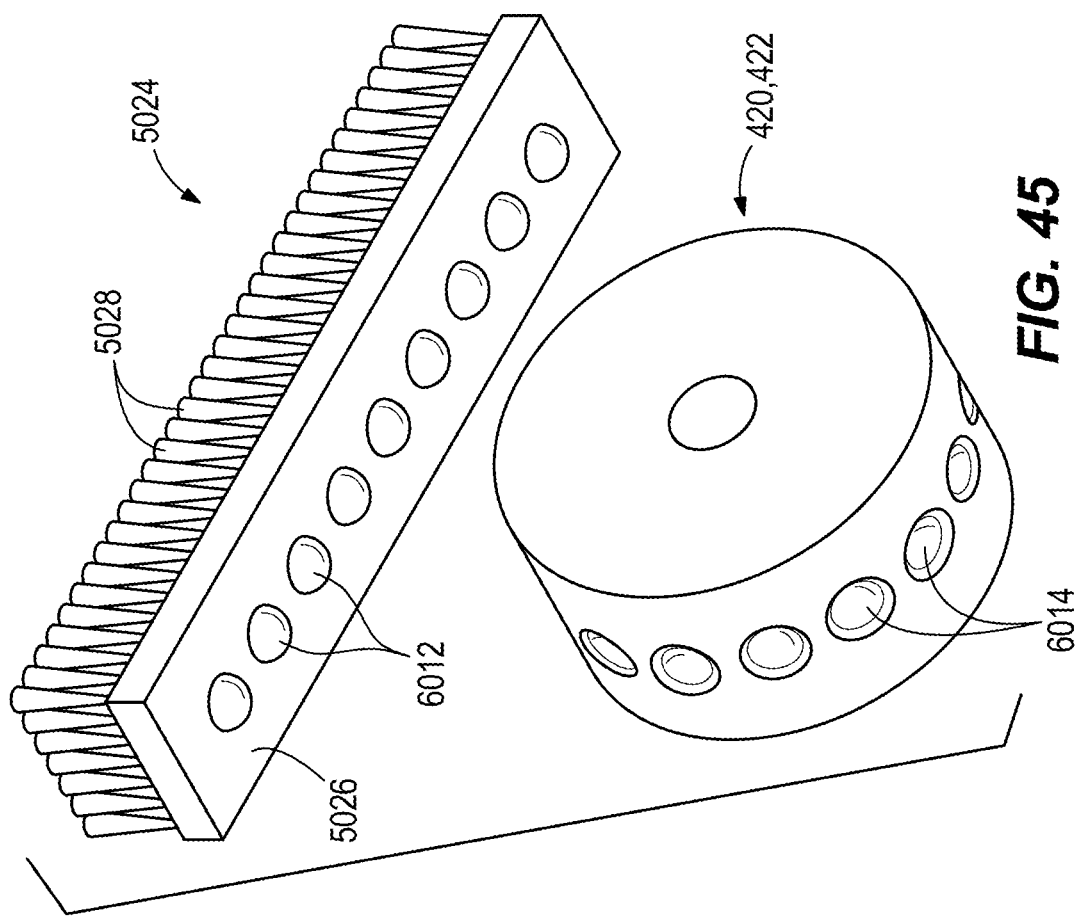
FIG. 45 is a perspective view of a brush belt for the delivery system according to another aspect and a pulley for use with the brush belt.

Alternatively and with respect to FIG. 45, the base member 5026 may have protrusions 6012 (e.g., rivet heads) that are coupled to and extend from the second side of the base member 5026 and that are received in grooves 6014 of the pulley 420, 422. The bristles 5028 are coupled on the first side of the base member 5026 and therefore opposite to the protrusions 6012.

Figure 46:
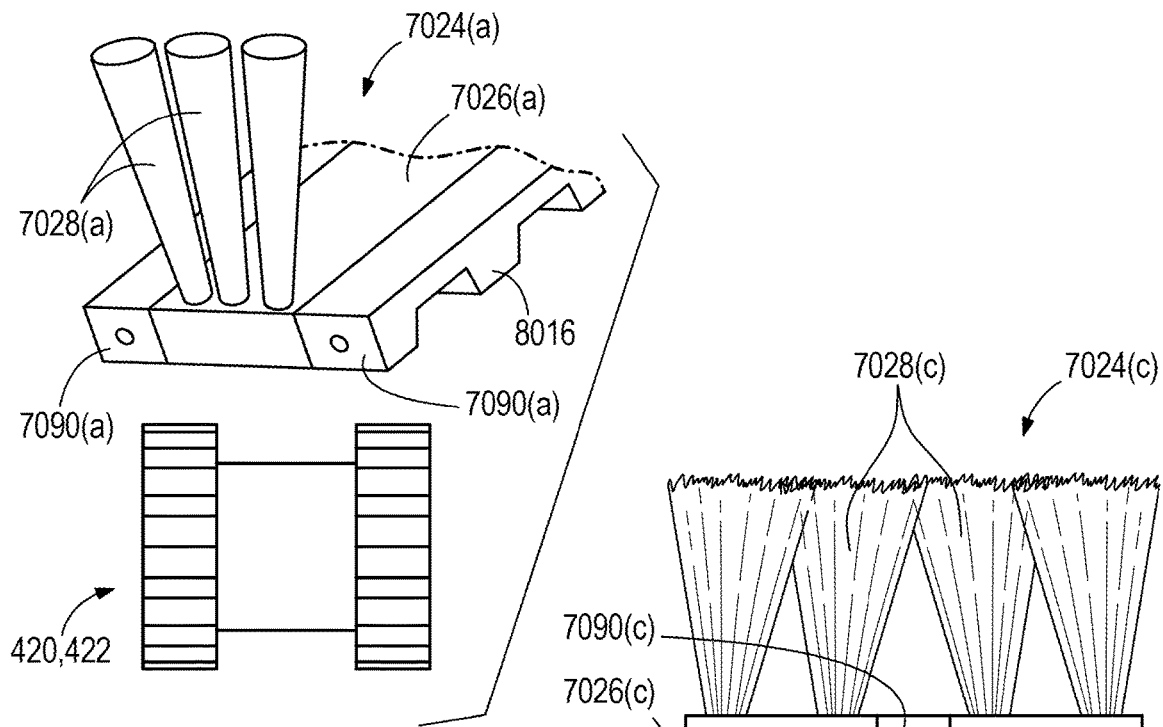
FIG. 46 is a perspective view of a brush belt for the delivery system according to another aspect and a pulley for use with the brush belt.
Figure 47:
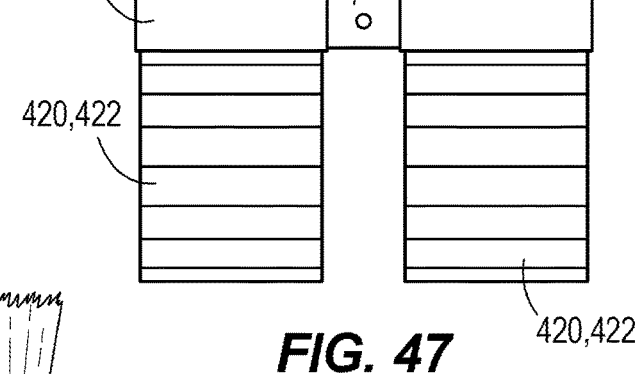
FIG. 47 is a cross-sectional view of a brush belt for the delivery system according to another aspect and a pulley for use with the brush belt.
Figure 48:
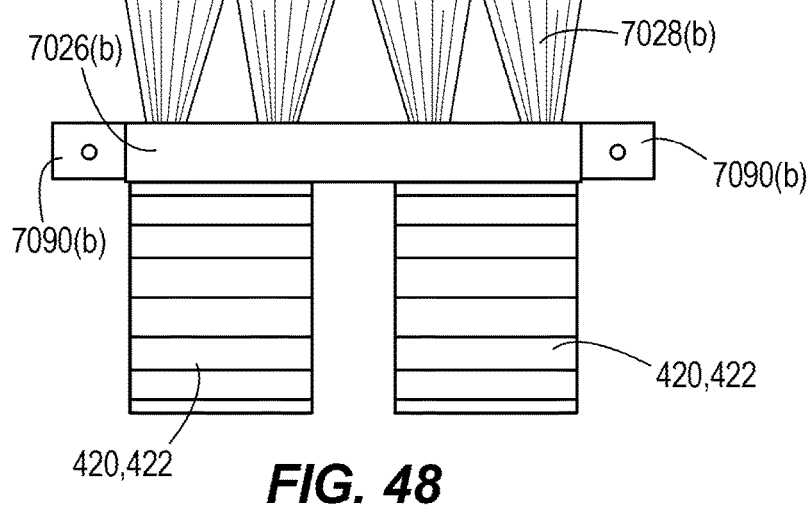
FIG. 48 is a cross-sectional view of a brush belt for the delivery system according to another aspect and a pulley for use with the brush belt.

Alternatively and with respect to FIGS. 37 and 46-48, the base member 7026(*a*)-(*c*) may have reinforcement elements 7090(*a*)-(*c*) that are coupled to or extend through the base member 7026(*a*)-(*c*). In the aspect of FIG. 37, the reinforcement elements 990(*g*) already detailed herein extend through the base member 926(*g*). In the aspect of FIG. 46, the reinforcement elements 7090(*a*) are coupled to both sides of the base member 7026(*a*). In the aspect of FIG. 48, the reinforcement elements 7090(*b*) are coupled to one side of the base member 7026(*b*). In the aspect of FIG. 47, the reinforcement member 7026(*c*) is coupled in the center of the base member 7026(*c*). The reinforcement element 7090(*a*) may also have teeth 8016, which engage teeth of the pulley, as shown in FIG. 46. In these aspects, the bristles 7028(*a*)-(*c*) are coupled to the base member 7026(*a*)-(*c*) where the reinforcement elements 7090(*a*)-(*c*) are not.

The bristles and brush elements discussed herein may be coupled to the base member by any suitable method. For example, the bristles and brush elements may be stapled, molded in, welded, or adhesively coupled to the base member. Alternatively, the bristles and brush elements may be coupled in other ways, such as using the method described with respect to FIGS. 30-36.

Features described with respect to one aspect, though not expressly associated with other aspects, may be implemented or incorporated as part of other brush belts disclosed herein. For example, the bristles or brush elements of any aspect may additionally be constructed from one or more materials, such as polypropylene, nylon, polyester, any polymer, urethane, or natural fiber (e.g., horse hair, camel hair, hogs hair, etc.). Also, the bristles or brush elements of any aspect may also be either straight or crimped (e.g., wavy). Also, the bristles and brush elements of any aspect may additionally have variable lengths and create undulating surface profiles as discussed herein with respect to FIGS. 12-16A. Also, the bristles and brush elements of any aspect may additionally have variable cross-sectional shapes and dimensions as discussed in greater detail herein with respect to FIGS. 18-22. Also, any of the aspects herein may have a variable thickness as discussed with respect to FIGS. 17 and 17B. Moreover, any aspect may have bristles that are directly coupled to the base member or bristles that are organized into brush elements that are coupled to the base member. Any aspect may include a base member with teeth or a reinforcement element, as well.

Although the disclosure has been described in detail with reference to certain preferred aspects, variations and modifications exist within the scope and spirit of one or more independent aspects of the disclosure as described. Various features and advantages of the disclosure are set forth in the following claims.

What is claimed is:

1. A delivery system for a seed meter, the delivery system comprising:
   a drive pulley including a plurality of pulley teeth and a plurality of pulley grooves, teeth of the plurality of pulley teeth alternating with grooves of the plurality of pulley grooves about a periphery of the drive pulley; and
   a brush belt including
      a base member having a longitudinal axis, a mounting surface, and a traction surface having a plurality of traction teeth and a plurality of traction grooves, teeth of the plurality of traction teeth alternating with grooves of the plurality of traction grooves along the longitudinal axis, wherein rotation of the drive pulley causes each tooth of the plurality of pulley teeth to engage one groove of the plurality of traction grooves, wherein the base member extends along a base member width perpendicular to the longitudinal axis, and each traction tooth extends across a portion of the base member width along a traction tooth width, the traction tooth width being less than the base member width, and
      a plurality of bristles extending from the mounting surface, each bristle of the plurality of bristles having a first end proximal to the mounting surface and a second end distal thereto, the second ends of the plurality of bristles collectively presenting a continuous bristle surface.

2. The delivery system of claim 1, wherein
   the plurality of pulley teeth is a first plurality of pulley teeth and the plurality of traction teeth is a first plurality of traction teeth,
   the drive pulley further includes a second plurality of pulley teeth and a second plurality of pulley grooves, teeth of the second plurality of pulley teeth alternating with grooves of the second plurality of pulley grooves about a periphery of the drive pulley, and
   the traction surface includes a second plurality of traction teeth and a second plurality of traction grooves, teeth of the second plurality of traction teeth alternating with grooves of the second plurality of traction grooves along the longitudinal axis, wherein rotation of the drive pulley causes each tooth of the second plurality of pulley teeth to engage one groove of the second plurality of traction grooves.

3. The delivery system of claim 2, wherein the base member includes a first side and a second side, the first side and the second side being on opposite sides of the longitudinal axis, the first plurality of traction teeth extends along the first side of the base member and the second plurality of traction teeth extends along the second side of the base member.

4. The delivery system of claim 2, wherein the first plurality of traction teeth and the second plurality of traction teeth are positioned on opposite sides of the longitudinal axis, and wherein the plurality of bristles include first bristles each having a first cross-sectional dimension and second bristles each having a second cross-sectional dimension less than the first cross-sectional dimension.

5. The delivery system of claim 2, wherein the base member includes a first side and a second side, the first side and the second side being on opposite sides of the longitudinal axis, each tooth of the first plurality of traction teeth is aligned with a corresponding tooth of the second plurality of traction teeth along a common axis that extends between the first side and the second side of the base member and that is perpendicular to the longitudinal axis.

6. The delivery system of claim 2, wherein each traction tooth defines a first length extending along the longitudinal axis of the base member and each traction groove defines a second length extending along the longitudinal axis of the base member, the first length being substantially similar to the second length, and wherein each tooth of the first plurality of traction teeth is spaced apart from a corresponding tooth of the second plurality of traction teeth in a direction perpendicular to the longitudinal direction.

7. The delivery system of claim 1, wherein each traction tooth defines a first length extending along the longitudinal axis of the base member and each traction groove defines a second length extending along the longitudinal axis of the base member, the first length being substantially similar to the second length, and wherein each tooth of the first plurality of traction teeth is spaced apart from a corresponding tooth of the second plurality of traction teeth in a direction perpendicular to the longitudinal direction.

8. A brush belt configured for use with a delivery system including a drive pulley having a plurality of pulley teeth and a plurality of pulley grooves, teeth of the plurality of pulley teeth alternating with grooves of the plurality of pulley grooves about a circumference of the drive pulley, the brush belt comprising:
- a base member having a longitudinal axis, a mounting surface, and a traction surface having a plurality of traction teeth, wherein each tooth of the plurality of traction teeth is configured to engage one groove of the plurality of pulley grooves during rotation of the drive pulley, wherein each traction tooth defines a first length extending along the longitudinal axis of the base member and each traction groove defines a second length extending along the longitudinal axis of the base member, the first length being substantially similar to the second length; and
- a plurality of bristles, each bristle of the plurality of bristles having a first end proximal to the mounting surface and a second end distal thereto, the second ends of the plurality of bristles collectively presenting a continuous bristle surface.

9. The brush belt of claim 8, wherein the base member extends along a base member width perpendicular to the longitudinal axis, and each traction tooth extends across a portion of the base member width along a traction tooth width, the traction tooth width being less than the base member width.

10. The brush belt of claim 8, wherein the plurality of traction teeth is a first plurality of traction teeth, and wherein the traction surface further includes a second plurality of traction teeth, and wherein the base member includes a first side and a second side, the first side and the second side being on opposite sides of the longitudinal axis, the first plurality of traction teeth extends along the first side of the base member and the second plurality of traction teeth extends along the second side of the base member.

11. The delivery system of claim 8, wherein the plurality of traction teeth is a first plurality of traction teeth, and wherein the traction surface further includes a second plurality of traction teeth, and wherein the first plurality of traction teeth and the second plurality of traction teeth are positioned on opposite sides of the longitudinal axis.

12. The delivery system of claim 8, wherein the plurality of traction teeth is a first plurality of traction teeth, and wherein the traction surface further includes a second plurality of traction teeth, and wherein the base member includes a first side and a second side, the first side and the second side being on opposite sides of the longitudinal axis, each tooth of the first plurality of traction teeth is aligned with a corresponding tooth of the second plurality of traction teeth along a common axis that extends between the first side and the second side of the base member and that is perpendicular to the longitudinal axis.

13. The delivery system of claim 8, wherein the plurality of traction teeth is a first plurality of traction teeth, and wherein the traction surface further includes a second plurality of traction teeth, and wherein each tooth of the first plurality of traction teeth is spaced apart from a corresponding tooth of the second plurality of traction teeth.

14. The delivery system of claim 8, wherein the plurality of bristles includes first bristles each having a first cross-sectional dimension and second bristles each having a second cross-sectional dimension less than the first cross-sectional dimension.

15. A brush belt comprising:
- a base member configured as a continuous loop and having a first side, a second side positioned opposite the first side, a width defined between the first side and the second side, an outward surface extending between the first side and the second side, an enclosed inward surface opposite the outward surface and extending between the first side and the second side, the outward surface being in the form of a mounting surface and the inward surface being in the form of a traction surface, the traction surface including a plurality of traction teeth extending about a circumference of the continuous loop, each tooth of the plurality of traction teeth extending between the first side to a location between the first side and the second side; and
- a plurality of bristles extending outwardly from the mounting surface, each bristle of the plurality of bristles having a first end proximal to the mounting surface and a second end distal thereto.

16. The brush belt of claim 15, wherein the base member extends a first width between the first side and the second side, and the plurality of traction teeth extend a second width between the first side and the location between the first side and the second side, the second width being less than the first width.

17. The brush belt of claim 16, wherein the plurality of traction teeth is a first plurality of traction teeth, and wherein the traction surface includes a second plurality of traction teeth extending consecutively about the circumference of the continuous loop, each tooth of the second plurality of teeth extending at least partially between the first side and the second side, and wherein the first plurality of traction teeth extends along the first side of the base member and the second plurality of traction teeth extends along the second side of the base member.

18. The brush belt of claim 15, wherein the plurality of traction teeth is a first plurality of traction teeth, and wherein the traction surface includes a second plurality of traction teeth extending consecutively about the circumference of the continuous loop, each tooth of the second plurality of teeth between the second side and a location between the first side and the second side, and wherein each tooth of the first plurality of traction teeth is aligned with a corresponding one tooth of each of the second plurality of traction teeth along a common axis that extends along the width between the first side and the second side of the base member.

19. The brush belt of claim 15, wherein the plurality of traction teeth is a first plurality of traction teeth, and wherein the traction surface includes a second plurality of traction teeth extending consecutively about the circumference of the continuous loop, each tooth of the second plurality of teeth extending between the second side and a location between the first side and the second side, and wherein each tooth of the first plurality of traction teeth is spaced apart from a corresponding tooth of the second plurality of traction teeth.

20. The brush belt of claim 15, wherein the base member is configured to be driven by a drive pulley having a plurality of pulley teeth and a plurality of pulley grooves, teeth of the plurality of pulley teeth alternating with grooves of the plurality of pulley grooves about a circumference of the drive pulley, wherein each tooth of the plurality of traction teeth is configured to engage one groove of the plurality of pulley grooves during rotation of the drive pulley, and wherein each tooth of the plurality of pulley teeth defines a first arc length extending around the circumference of the drive pulley and each groove of the plurality of pulley grooves defines a second arc length extending around the circumference of the drive pulley, the first arc length being substantially similar to the second arc length.

* * * * *